(12) United States Patent
Li et al.

(10) Patent No.: US 12,675,707 B2
(45) Date of Patent: Jul. 7, 2026

(54) MACHINE LEARNING-BASED ANOMALY DETECTION USING A MULTI-LAYER PREDICTOR WITH HYBRID INPUTS

(71) Applicant: CHINA UNIONPAY CO., LTD., Shanghai (CN)

(72) Inventors: Wenqi Li, Shanghai (CN); Gao Lin, Shanghai (CN); Jinjie Liu, Shanghai (CN); Zhenhu Le, Shanghai (CN); Yang Zhao, Shanghai (CN)

(73) Assignee: China UnionPay Co., Ltd., Shanghai (CN)

( * ) Notice: Subject to any disclaimer, the term of this patent is extended or adjusted under 35 U.S.C. 154(b) by 840 days.

(21) Appl. No.: 18/008,808

(22) PCT Filed: Sep. 26, 2021

(86) PCT No.: PCT/CN2021/120587
§ 371 (c)(1),
(2) Date: Dec. 7, 2022

(87) PCT Pub. No.: WO2022/078186
PCT Pub. Date: Apr. 21, 2022

(65) Prior Publication Data
US 2023/0222362 A1 Jul. 13, 2023

(30) Foreign Application Priority Data
Oct. 14, 2020 (CN) .......................... 202011094653.2

(51) Int. Cl.
*G06N 5/022* (2023.01)
*G06N 20/10* (2019.01)
*G06N 20/20* (2019.01)
(52) U.S. Cl.
CPC ............. *G06N 5/022* (2013.01); *G06N 20/10* (2019.01); *G06N 20/20* (2019.01)

(58) Field of Classification Search
None
See application file for complete search history.

(56) References Cited

FOREIGN PATENT DOCUMENTS

| CN | 107527124 A | 12/2017 |
| CN | 109446017 | 3/2019 |

(Continued)

OTHER PUBLICATIONS

Boehmke et al., Hands-On Machine Learning with R; Chapman & Hall/CRC; Published: Feb. 1, 2020; https://bradleyboehmke.github.io/HOML/ ; Total Pages: 38 (Year: 2020).*

(Continued)

*Primary Examiner* — Alan Chen
(74) *Attorney, Agent, or Firm* — Nixon & Vanderhye P.C.

(57) ABSTRACT

Disclosed are a method and an apparatus for real-time data monitoring based on machine learning, the method including: training a multi-layer predictor on actual values of historical indicator data, each layer of the multi-layer predictor including a plurality of predictors of different types; outputting predicted values of future indicator data by inputting a future time period for prediction into the trained multi-layer predictor; calculating alarm thresholds from the predicted values of the future indicator data and historical prediction errors; and triggering an alarm when an actual value of the future indicator data exceeds the corresponding alarm threshold. The accuracy of the alarm thresholds can be improved, and the alarm thresholds can be well adapted to the constantly changing indicator data. There is no need to manually configure a fixed alarm threshold, the accuracy of the alarm can be ensured, and the number of missed and false alarms can be reduced.

19 Claims, 12 Drawing Sheets

(56) References Cited

FOREIGN PATENT DOCUMENTS

| CN | 109446017 A | 3/2019 |
|----|-------------|--------|
| CN | 110008079   | 7/2019 |
| CN | 110489306   | 11/2019 |
| CN | 111475804 A | 7/2020 |
| CN | 111679952   | 9/2020 |
| CN | 111679952 A | 9/2020 |
| CN | 107527124   | 1/2021 |
| CN | 112256526   | 1/2021 |

OTHER PUBLICATIONS

Kongdee et al., How to set up CloudWatch Anomaly Detection to set dynamic alarms, automate actions, and drive online sales; https://aws.amazon.com/blogs/mt/how-to-set-up-cloudwatch-anomaly-detection-to-set-dynamic-alarms-automate-actions-and-drive-online-sales/ ; Published: Jan. 29, 2020; Total Pages: 12 (Year: 2020).*
International Search Report for PCT/CN2021/120587, mailed Dec. 15, 2021, 7 pages.
Written Opinion of the ISA for PCT/CN2021/120587, mailed Dec. 15, 2021, 6 pages.

* cited by examiner

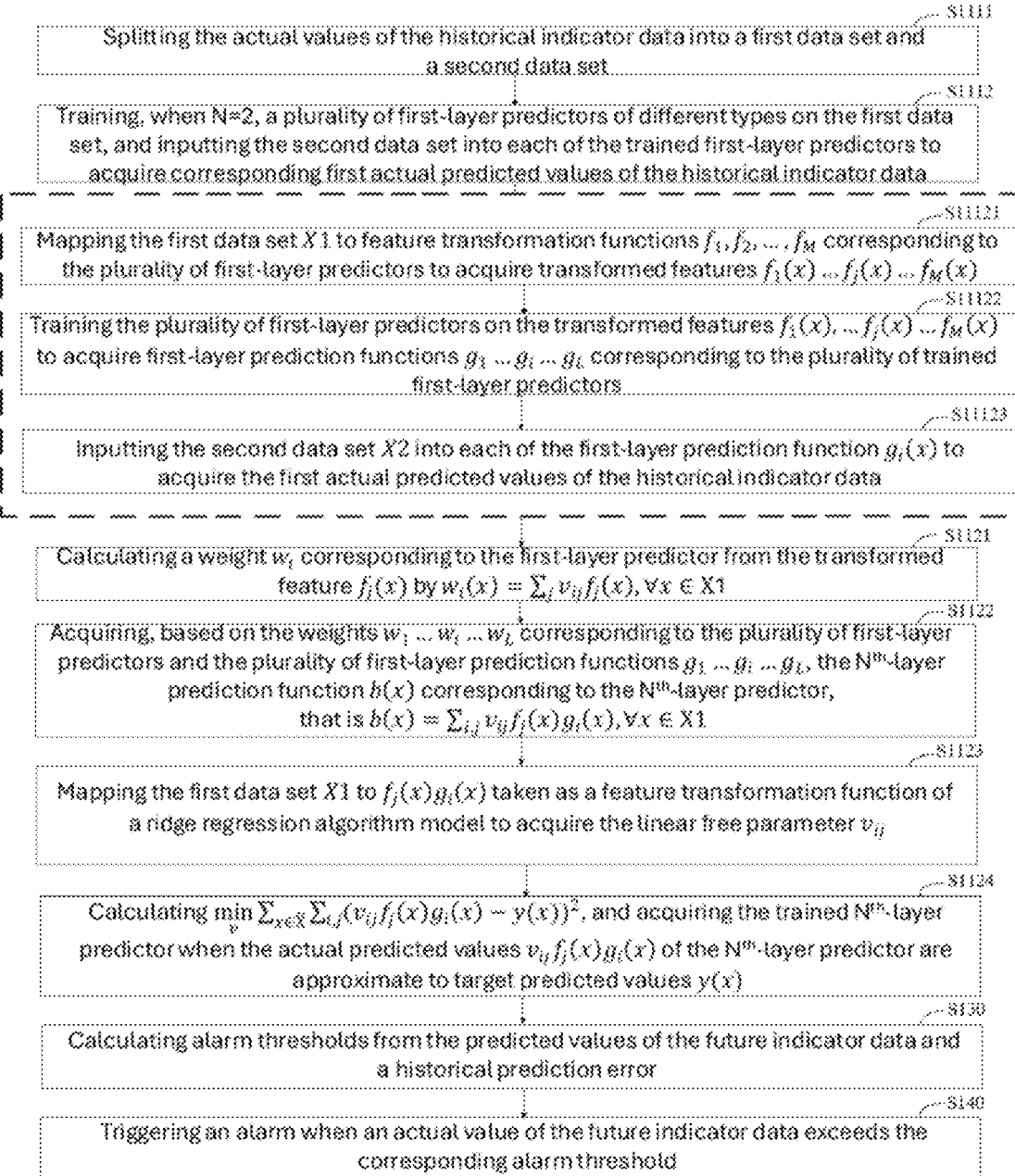

S1111
Splitting the actual values of the historical indicator data into a first data set and a second data set S1112
Training, when N≈2, a plurality of first-layer predictors of different types on the first data set, and inputting the second data set into each of the trained first-layer predictors to acquire corresponding first actual predicted values of the historical indicator data S1121
Mapping the first data set $X1$ to feature transformation functions $f_1, f_2, \dots f_M$ corresponding to the plurality of first-layer predictors to acquire transformed features $f_1(x) \dots f_j(x) \dots f_M(x)$ S1122
Training the plurality of first-layer predictors on the transformed features $f_1(x), \dots f_j(x) \dots f_M(x)$ to acquire first-layer prediction functions $g_1 \dots g_i \dots g_L$ corresponding to the plurality of trained first-layer predictors S1123
Inputting the second data set $X2$ into each of the first-layer prediction function $g_i(x)$ to acquire the first actual predicted values of the historical indicator data S1121
Calculating a weight $w_i$ corresponding to the first-layer predictor from the transformed feature $f_j(x)$ by $w_i(x) = \sum_j v_{ij} f_j(x), \forall x \in X1$ S1122
Acquiring, based on the weights $w_1 \dots w_i \dots w_L$ corresponding to the plurality of first-layer predictors and the plurality of first-layer prediction functions $g_1 \dots g_i \dots g_L$, the $N^{th}$-layer prediction function $h(x)$ corresponding to the $N^{th}$-layer predictor, that is $h(x) = \sum_{i,j} v_{ij} f_j(x) g_i(x), \forall x \in X1$ S1123
Mapping the first data set $X1$ to $f_j(x) g_i(x)$ taken as a feature transformation function of a ridge regression algorithm model to acquire the linear free parameter $v_{ij}$ S1124
Calculating $\min_v \sum_{x \in X} \sum_{i,j} (v_{ij} f_j(x) g_i(x) - y(x))^2$, and acquiring the trained $N^{th}$-layer predictor when the actual predicted values $v_{ij} f_j(x) g_i(x)$ of the $N^{th}$-layer predictor are approximate to target predicted values $y(x)$ S130
Calculating alarm thresholds from the predicted values of the future indicator data and a historical prediction error S140
Triggering an alarm when an actual value of the future indicator data exceeds the corresponding alarm threshold

FIG. 5

MACHINE LEARNING-BASED ANOMALY DETECTION USING A MULTI-LAYER PREDICTOR WITH HYBRID INPUTS

This application is the U.S. national phase of International Application No. PCT/CN2021/120587 filed Sep. 26, 2021 which designated the U.S. and claims priority to Chinese Patent Application No. 202011094653.2, filed on Oct. 14, 2020 and entitled "DATA REAL-TIME MONITORING METHOD AND APPARATUS BASED ON MACHINE LEARNING", the entire contents of each of which are incorporated herein by reference.

TECHNICAL FIELD

The present disclosure relates to the field of machine learning, in particular to the field of real-time data monitoring based on machine learning.

BACKGROUND

Business monitoring mainly focuses on real-time monitoring of indicator data of business status in a business system to facilitate in-depth statistical analysis, thereby helping businesses to identify problems and find root causes of the problems. When a fault occurs in the business system, the capacity to detect the fault timely and accurately is rather crucial to maintain the business system stability. Fault situations of the business system are generally expressed as changes in the indicator data of the business status within a certain period of time. Thus, an alarm is generated when an abnormality occurs in any item of the latency indicator data of the monitored object, for the staff handling the fault in time according to the alarm.

The existing monitoring method is implemented mainly by manually configuring uniform alarm thresholds. However, the data characteristics of each monitored object may vary. For example, the average processing time may vary from one millisecond to one thousand five hundred milliseconds. Thus, the uniformly configured alarm thresholds may be hardly adapted to most of the objects, which may cause many missed and false alarms. Alternatively, the alarm thresholds may be dynamically adjusted. For example, the alarm thresholds may be predicted with linear regression, or maximum and minimum values within a period of time may be taken as the upper and lower alarm thresholds. However, the dynamically configured thresholds may fail to be adapted to a large number of monitored objects; or the dynamically configured thresholds may be partially adapted to some objects, with ranges defined by the rest to be too large or too small, resulting in many missed or false alarms.

SUMMARY

Embodiments of the present disclosure provide a method and an apparatus for real-time data monitoring based on machine learning to solve the problems in the related art, which include the following technical solutions.

According to a first aspect, provided is a method of real-time data monitoring based on machine learning, which includes:

training a multi-layer predictor on actual values of historical indicator data, each layer of the multi-layer predictor including a plurality of predictors of different types;

outputting predicted values of future indicator data by inputting a future time period for prediction into the trained multi-layer predictor;

calculating alarm thresholds from the predicted values of the future indicator data and historical prediction errors; and triggering an alarm when an actual value of the future indicator data exceeds the corresponding alarm threshold.

In an embodiment, the plurality of predictors of different types include an elastic net predictor, a decision tree predictor, a k-nearest neighbor predictor, a random forest predictor, a lasso regression predictor, a support vector regression predictor, and a gradient boosting predictor.

In an embodiment, training the multi-layer predictor on the actual values of the historical indicator data includes steps of:

training a plurality of $(N-1)^{th}$-layer predictors of different types on the actual values of the historical indicator data, and predicting $(N-1)^{th}$ actual predicted values of the historical indicator data by using the trained $(N-1)^{th}$-layer predictors;

training at least one $N^{th}$-layer predictor on target predicted values of the historical indicator data and a hybrid data set acquired by mixing all the $(N-1)^{th}$ actual predicted values, where the trained $N^{th}$-layer predictor is configured to predict $N^{th}$ actual predicted values of the historical indicator data, N being greater than or equal to 2; and constructing the multi-layer predictor with a plurality of trained first-layer predictors to the trained $N^{th}$-layer predictor when a layer number N reaches a corresponding predetermined value.

In an embodiment, the method further includes:

proceeding with again training at least one $N^{th}$-layer predictor on the target predicted values of the historical indicator data and the hybrid data set acquired by mixing all the $(N-1)^{th}$ actual predicted values, when the layer number N does not reach the corresponding predetermined value.

In an embodiment, the step of training the plurality of $(N-1)^{th}$-layer predictors of different types on the actual values of the historical indicator data and predicting $(N-1)^{th}$ actual predicted values of the historical indicator data by using the trained $(N-1)^{th}$-layer predictors includes:

splitting the actual values of the historical indicator data into a first data set and a second data set; and training, when N=2, a plurality of first-layer predictors of different types on the first data set, and inputting the second data set into each of the trained first-layer predictors to acquire corresponding first actual predicted values of the historical indicator data.

In an embodiment, training, when N=2, the plurality of first-layer predictors of different types on the first data set, and inputting the second data set into each of the trained first-layer predictors to acquire corresponding first actual predicted values of the historical indicator data includes:

mapping the first data set $X1(x \in X1)$ to feature transformation functions $f_1, f_2, \ldots, f_M$ corresponding to the plurality of first-layer predictors to acquire transformed features $f_1(x) \ldots f_j(x) \ldots f_M(x)$, where $f_1(x) \in$ a set of real numbers;

training the plurality of first-layer predictors on the transformed features $f_1(x), \ldots f_j(x) \ldots f_M(x)$ to acquire first-layer prediction functions $g_1 \ldots g_i \ldots g_L$ corresponding to the plurality of trained first-layer predictors; and inputting the second data set $X2(x \in X2)$ into each of the first-layer prediction functions $g_i(x)$ to acquire the first actual predicted values of the historical indicator data;

where $i=1 \ldots L$, $j=1 \ldots M$, $L \geq 1$, $M \geq 1$, $M \geq L$, M refers to the number of the feature transformation functions, and L refers to the number of the first-layer predictors.

In an embodiment, the step of training at least one $N^{th}$-layer predictor on the target predicted values of the historical indicator data and the hybrid data set acquired by mixing all the first actual predicted values when the layer number N does not reach the corresponding predetermined value includes:

calculating weights $w_1$ corresponding to the first-layer predictor from the transformed features $f_j(x)$ by $w_1(x) = \in_j v_{ij} f_j(x)$, $\forall x \in X1$, where $v_{ij}$ refers to a linear free parameter;

acquiring, based on the weights $w_1 \ldots w_i \ldots w_L$ corresponding to the plurality of first-layer predictors and the plurality of first-layer prediction functions $g_1 \ldots g_i \ldots g_L$, the $N^{th}$-layer prediction function $b(x) = \in_i w_i g_i(x)$ corresponding to the $N^{th}$-layer predictor, that is $b(x) = \in_{i,j} v_{ij} f_j(x) g_i(x)$, $\forall x \in X1$;

mapping the first data set $X1(x \in X1)$ to $f_j(x)g_i(x)$ taken as a feature transformation function of a ridge regression algorithm model to acquire the linear free parameter $v_{ij}$; and calculating $$\min_v \sum_{x \in \tilde{X}} \sum_{i,j} (v_{ij} f_j(x) g_i(x) - y(x))^2,$$

and acquiring the trained $N^{th}$-layer predictor when the actual predicted values $v_{ij} f_j(x) g_i(x)$ of the $N^{th}$-layer predictors are approximate to target predicted values $y(x)$, where $y(x)$ refers to the target predicted values of respective data points x in the first data set, and X refers to a subset of X.

In an embodiment, the method further includes:

calculating, for a plurality of predetermined time periods within a historical period corresponding to the first data set, a learning rate for indicator data in each of the predetermined time periods by using a preselection function, such that the learning rate of each of the trained first-layer predictors increases when a difference between each of the predetermined time periods and a current time period decreases.

In an embodiment, the method further includes:

calculating, for a plurality of predetermined time periods within a historical period corresponding to the second data set, a learning rate of indicator data in each of the predetermined time periods by using a preselection function, such that the learning rate of each of the trained first-layer predictors increases when a difference between each of the predetermined time periods and a current time period decreases.

In an embodiment, the method further includes:

calculating, for a historical time period corresponding to the first actual predicted values of each historical indicator data, a learning rate for the first actual predicted values corresponding to each of the historical time period by using the preselection function, such that the learning rate of each of the trained first-layer predictors increases when a difference between each of the historical time period and a current time period decreases.

In an embodiment, calculating the alarm thresholds from the predicted values of the future indicator data and the historical prediction errors includes:

calculating the historical prediction errors by subtracting the actual values of the historical indicator data from the $N^{th}$ actual predicted values of the historical indicator data; and calculating the alarm thresholds from the predicted values of the future indicator data and the historical prediction errors according to a three sigma rule.

According to a second aspect, provided is an apparatus for real-time data monitoring based on machine learning, which includes:

a multi-layer predictor training module configured to train a multi-layer predictor on actual values of historical indicator data, each layer of the multi-layer predictor including a plurality of predictors of different types;

a predicted value calculating module configured to output predicted values of future indicator data by inputting a future time period for prediction into the trained multi-layer predictor;

an alarm threshold calculating module configured to calculate alarm thresholds from the predicted values of the future indicator data and historical prediction errors; and an alarm triggering module configured to trigger an alarm when an actual value of the future indicator data exceeds the corresponding alarm threshold.

In an embodiment, the plurality of predictors of different types include an elastic net predictor, a decision tree predictor, a k-nearest neighbor predictor, a random forest predictor, a lasso regression predictor, a support vector regression predictor, and a gradient boosting predictor.

In an embodiment, the multi-layer predictor training module includes:

an $(N-1)^{th}$-layer predictor training sub-module configured to train a plurality of $(N-1)^{th}$-layer predictors of different types on the actual values of the historical indicator data, where the trained $(N-1)^{th}$-layer predictor is configured to predict $(N-1)^{th}$ actual predicted values of the historical indicator data;

an $N^{th}$-layer predictor training sub-module configured to train at least one $N^{th}$-layer predictor on target predicted values of the historical indicator data and a hybrid data set acquired by mixing all the $(N-1)^{th}$ actual predicted values, where the trained $N^{th}$-layer predictor is configured to predict $N^{th}$ actual predicted values of the historical indicator data, N being greater than or equal to 2; and a multi-layer predictor constructing sub-module configured to construct the multi-layer predictor with a plurality of trained first-layer predictors to the trained $N^{th}$-layer predictor when a layer number N reaches a corresponding predetermined value.

In an embodiment, the multi-layer predictor training module further includes:

a triggering sub-module configured to trigger the $N^{th}$-layer predictor training sub-module to train at least one $N^{th}$-layer predictor on the target predicted values of the historical indicator data and the hybrid data set acquired by mixing all the $(N-1)^{th}$ actual predicted values when the layer number N does not reach the corresponding predetermined value.

In an embodiment, the first-layer predictor training sub-module includes:

a data set splitting unit configured to split the actual values of the historical indicator data into a first data set and a second data set; and a first actual predicted value calculating unit configured to train, when N=2, a plurality of first-layer predictors of different types on the first data set, and input the second data set into each of the trained first-layer predictors to acquire corresponding first actual predicted values of the historical indicator data.

In an embodiment, the first actual predicted value calculating unit includes:

a feature transformation sub-unit configured to map the first data set X1(x∈X1) to feature transformation functions $f_1, f_2, \ldots, f_M$ corresponding to the plurality of first-layer predictors to acquire transformed features $f_1(x) \ldots f_j(x) \ldots f_M(x)$, where $f_j(x)∈$ a set of real numbers;

a first-layer prediction function training sub-unit configured to train the plurality of first-layer predictors on the transformed features $f_1(x), \ldots f_j(x) \ldots f_M(x)$ to acquire first-layer prediction functions $g_1 \ldots g_i \ldots g_L$ corresponding to the plurality of trained first-layer predictors; and a first actual predicted value calculating sub-unit configured to input the second data set X2(x∈X2) into each of the first-layer prediction functions $g_i(x)$ to acquire the first actual predicted values of the historical indicator data;

where i=1 . . . L, j=1 . . . M, L≥1, M≥1, M≥L, M refers to the number of the feature transformation functions, and L refers to the number of the first-layer predictors.

In an embodiment, the $N^{th}$-layer predictor training sub-module includes:

a weight calculating unit configured to calculate weights $w_1$ corresponding to the first-layer predictors from the transformed features $f_j(x)$ by $w_i(x)=∈_i v_{ij} f_j(x)$, ∀x∈X1, where $v_{ij}$ refers to a linear free parameter;

an $N^{th}$-layer prediction function calculating unit configured to acquire, based on the weights $w_1 \ldots w_i \ldots w_L$ corresponding to the plurality of first-layer predictors and the plurality of first-layer prediction functions $g_1 \ldots g_i \ldots g_L$, the $N^{th}$-layer prediction function $b(x)=∈_i w_i g_i(x)$ corresponding to the $N^{th}$-layer predictor, that is $b(x)=∈_{i,j} v_{ij} f_j(x) g_i(x)$, ∀x∈X1;

a linear free parameter calculating unit configured to map the first data set X1(x∈X1) to $f_i(x) g_i(x)$ taken as a feature transformation function of a ridge regression algorithm model to acquire the linear free parameter $v_{ij}$; and an $N^{th}$-layer predictor training unit configured to calculate $$\min_v \sum\nolimits_{x∈\tilde{X}} \sum\nolimits_{i,j} (v_{ij} f_j(x) g_i(x) - y(x))^2$$

and acquire the trained $N^{th}$-layer predictor when the actual predicted values $v_{ij} f_j(x) g_i(x)$ of the $N^{th}$-layer predictor are approximate to target predicted values y(x), where y(x) refers to the target predicted values of respective data points x in the first data set, and $\tilde{X}$ refers to a subset of X.

In an embodiment, the apparatus further includes:

a first learning rate calculating module configured to calculate, for a plurality of predetermined time periods within a historical period corresponding to the first data set, a learning rate for indicator data in each of the predetermined time periods by using a preselection function, such that the learning rate of each of the trained first-layer predictors increases when a difference between each of the predetermined time periods and a current time period decreases.

In an embodiment, the apparatus further includes:

a second learning rate calculating module configured to calculate, for a plurality of predetermined time periods within a historical period corresponding to the second data set, a learning rate for indicator data in each of the predetermined time periods by using a preselection function, such that the learning rate of each of the trained first-layer predictors increases when a difference between each of the predetermined time periods and a current time period decreases.

In an embodiment, the apparatus further includes:

a third learning rate calculating module configured to calculate, for a historical time period corresponding to the first actual predicted values of each historical indicator data, a learning rate for the first actual predicted values corresponding to each of the historical time period by using the preselection function, such that the learning rate of each of the trained first-layer predictors increases when a difference between each of the historical time period and a current time period decreases.

In an embodiment, the alarm threshold calculating module includes:

a historical prediction error calculating sub-module configured to calculate the historical prediction errors by subtracting the actual values of the historical indicator data from the $N^{th}$ actual predicted values of the historical indicator data; and an alarm threshold calculating sub-module configured to calculate the alarm thresholds from the predicted values of the future indicator data and the historical prediction errors according to a three sigma rule.

According to a third aspect, provided is an electronic device, which includes:

at least one processor; and a memory, communicatively connected to the at least one processor; where the memory has instructions executable by the at least one processor stored therein, the instructions, when executed by the at least one processor, causing the method according to any one of the aforesaid aspects to be implemented.

According to a fourth aspect, provided is a non-instantaneous computer readable storage medium having computer instructions stored thereon, where the computer instructions are configured to cause a computer to implement the method according to any one of the aforesaid aspects.

The aforesaid embodiment of the present disclosure has following advantages or beneficial effects. In the indicator data monitoring method based on machine learning according to this embodiment, the indicator data of thousands of monitored objects in the business system is monitored for generating early alarms. The multi-layer prediction structure consisting of a variety of different predictors can predict the indicator data of the monitored objects in the future period (including the current period) more accurately, which means that the predicted values of the future indicator data can be predicted more accurately. Then, alarm thresholds are calculated from the predicted values of the future indicator data and the historical prediction errors, and an alarm is triggered when an actual value of the future indicator data exceeds the corresponding alarm threshold in a practical monitoring scenario. The multi-layer predictor can predict the indicator data of the monitored object in the future period more accurately and can thereby acquire the accurate predicted values of the future indicator data, such that the accuracy of the alarm thresholds can be improved, and the alarm thresholds can be well adapted to the constantly changing indicator data. Thus, there is no need to manually configure a fixed alarm threshold, the accuracy of the alarm can be ensured, and the number of missed and false alarms can be reduced.

Other effects of the aforesaid optional manners will be described below in conjunction with specific embodiments.

BRIEF DESCRIPTION OF THE DRAWINGS

The drawings means to facilitate understanding of the solution, and do not constitute a limitation to the present disclosure. In the drawings:

FIG. 5 is a schematic diagram of another method of real-time data monitoring based on machine learning according to an embodiment of the present disclosure;

DETAILED DESCRIPTION

The exemplary embodiments of the present disclosure will be described below in conjunction with the accompanying drawings, which include various details of the embodiments of the present disclosure to aid in understanding, and shall be considered merely exemplary. Accordingly, one of ordinary skill in the art should recognize that various changes and modifications can be made to the embodiments described herein without departing from the scope and spirit of the present disclosure. For the sake of clarity and brevity, descriptions of well-known features and structures have been omitted from the following description.

In the process of monitoring the business status, there are many kinds of monitored objects. Different monitored objects may have different indicator data characteristics in different time periods, and the change law of indicator data is rather complex. For each moment of each monitored object, a single predictor model may cover a relatively small range of monitored objects, and has a rather weak generalization ability. Thus, the indicator data as predicted by adopting the single predictor is not accurate, which in turn leads to poor accuracy of the alarm thresholds and thereby causes missed and false alarms. In order to solve the aforesaid technical problem, this embodiment provides a method of real-time data monitoring based on machine learning.

Figure 1:
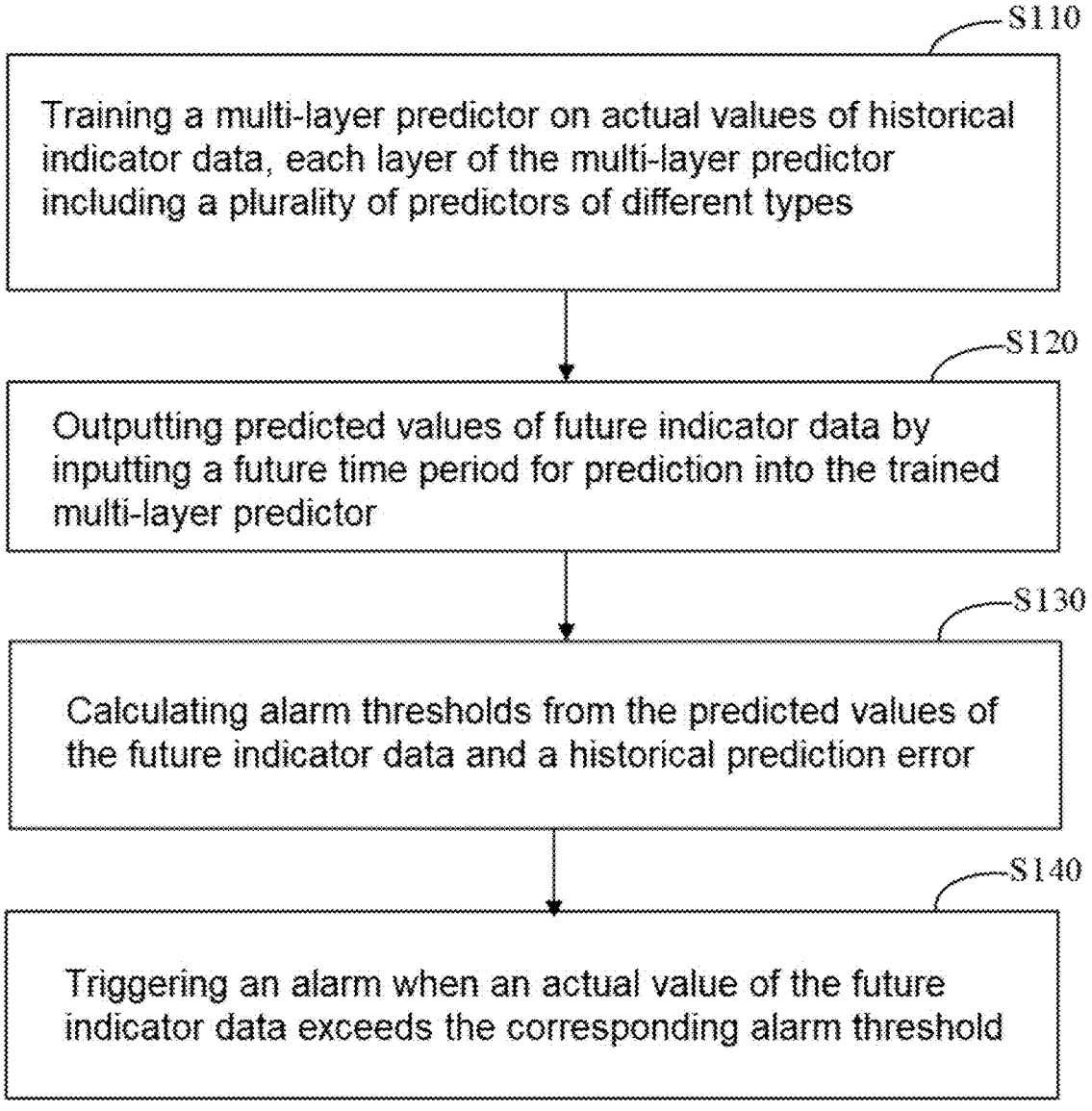
FIG. 1 is a schematic diagram of a method of real-time data monitoring based on machine learning according to an embodiment of the present disclosure.

FIG. 1 as shown is a schematic diagram of a method of real-time data monitoring based on machine learning according to some embodiments of the present disclosure. The flow in FIG. 1 may include following steps S110 to S140.

S110: Training a multi-layer predictor on actual values of historical indicator data, each layer of the multi-layer predictor including a plurality of predictors of different types.

S120: Outputting predicted values of future indicator data by inputting a future time period for prediction into the trained multi-layer predictor.

S130: Calculating alarm thresholds from the predicted values of the future indicator data and historical prediction errors.

S140: Triggering an alarm when an actual value of the future indicator data exceeds the corresponding alarm threshold.

In some examples, the monitored object may be all electronic transfer transactions in CUPS (UnionPay Bank Card Information Exchange System) of a sub-branch, transactions in payment transfer, Jingdong payment line in payment transfer, transactions per second in a branch, and the like. The indicator data can directly reflect the operation status of the monitored object, and thus determine whether the device is faulty. There are various types of indicator data, which may include latency indicator data, transaction count indicator data, TPS (transaction per second) indicator data, indicator data of upstream and downstream traffic per second in the network, and the like of the aforesaid monitored objects. For example, the latency indicator data may include response rate, processing time compliance rate, average processing time, and the like.

The actual values of the historical indicator data refers to the actual indicator data as monitored for any historical period. The historical period herein may be counted backwards from today to several days, e.g., the past 30 days, the past 50 days, the past week, and the like, and may be selected according to needs. For example, the actual values of the historical latency indicator data may include actual latency indicator data (response rate, processing time compliance rate, average processing time) as monitored in the past 30 days.

Since different types of indicator data may have different characteristics, each type of the indicator data having different characteristics may select to adopt a corresponding predictor to well predict the indicator data of the corresponding characteristic. Therefore, each layer of the multi-layer predictor may include different types of predictor to cover various different types of indicator data. The layer number of the multi-layer predictor includes at least two layers, and the specific layer number may be adaptively adjusted according to the needs. Preferably, the first-layer predictor shall try to cover all the indicator data with the same characteristics. Thus, the number and type of predictors in the first layer may be plentiful, and the second or upper-layer predictor may be provided with at least one predictor. The predictor may be an elastic net predictor, a decision tree predictor, a k-nearest neighbor predictor, a random forest predictor, a lasso regression predictor, a support vector regression predictor, and a gradient boosting predictor. The types and numbers of predictors include, but are not limited to, the aforesaid ones, and other types of predictors may be added based on the indicator data, all of which fall within the protection scope of this embodiment.

In the indicator data monitoring method based on machine learning according to this embodiment, the indicator data of thousands of monitored objects in a business system is monitored for generating early alarms. The multi-layer prediction structure consisting of a variety of different predictors can predict the indicator data of the monitored objects in the future period (including the current period) more accurately, which means that the predicted values of the future indicator data can be predicted more accurately. Then, alarm thresholds are calculated from the predicted values of the future indicator data and the historical prediction errors, and an alarm is triggered when an actual value of the future indicator data exceeds the corresponding alarm threshold in a practical monitoring scenario. The multi-layer predictor can predict the indicator data of the monitored object in the future period more accurately and can thereby acquire the accurate predicted values of the future indicator data, such that the accuracy of the alarm thresholds can be improved, and the alarm thresholds can be better adapted to the constantly changing indicator data. Thus, there is no need to manually configure a fixed alarm threshold, the accuracy of the alarm can be ensured, and the number of missed and false alarms can be reduced.

In an embodiment, the plurality of predictors of different types include an elastic net predictor, a decision tree predictor, a k-nearest neighbor predictor, a random forest predictor, a lasso regression predictor, a support vector regression predictor, and a gradient boosting predictor.

In an example, the first-layer predictor to the $N^{th}$-layer predictor may all include the elastic net predictor, the decision tree predictor, the k-nearest neighbor predictor, the random forest predictor, the lasso regression predictor, the support vector regression predictor, and the like. The specific number and type of the predictors may be adaptively adjusted according to actual needs, all of which fall within the protection scope of this embodiment. When the indicator data has few characteristics, it is preferred to select lasso regressors or elastic net predictors due to their capacity of reducing the weight of useless characteristics to zero. The elastic net predictor may have a rather stable performance when the number of characteristics exceeds the number of training instances, or when some characteristics are strongly correlated. For the elastic net predictor, it shall be ensured that the L1 parametric penalty term and L2 parametric penalty term are always valid during the parameter adjusting process. The k-nearest neighbor predictor adopts a Gaussian function for designing weights, and the support vector regressor adopts a polynomial kernel function.

Figure 2:
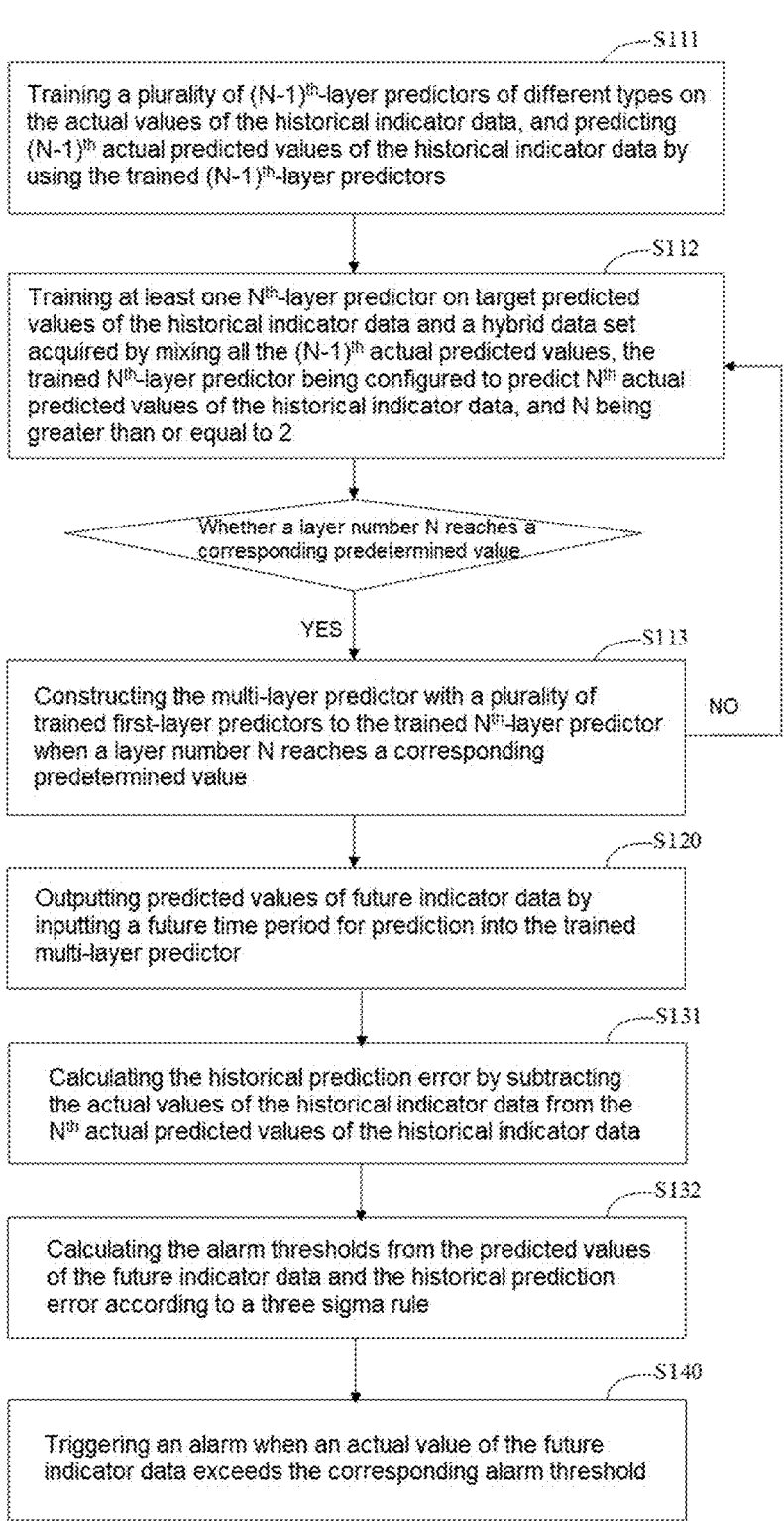
FIG. 2 is a schematic diagram of another method of real-time data monitoring based on machine learning according to an embodiment of the present disclosure.

In an embodiment, the step S110 as shown in FIG. 2 includes following steps S111 to S113.

S111: Training a plurality of $(N-1)^{th}$-layer predictors of different types on the actual values of the historical indicator data, and predicting $(N-1)^{th}$ actual predicted values of the historical indicator data by using the trained $(N-1)^{th}$-layer predictors S112: Training at least one $N^{th}$-layer predictor on target predicted values of the historical indicator data and a hybrid data set acquired by mixing all the $(N-1)^{th}$ actual predicted values, the trained $N^{th}$-layer predictor being configured to predict $N^{th}$ actual predicted values of the historical indicator data, and N being greater than or equal to 2

S113: Constructing the multi-layer predictor with a plurality of trained first-layer predictors to the $N^{th}$-layer predictor when a layer number N reaches a corresponding predetermined value In an example, a two-layer predictor (N=2) is adopted as an example to illustrate the specific process of training the two-layer predictor on the actual values of the historical indicator data, and the indicator data is illustrated by taking the latency indicator data as the example.

Figure 3:
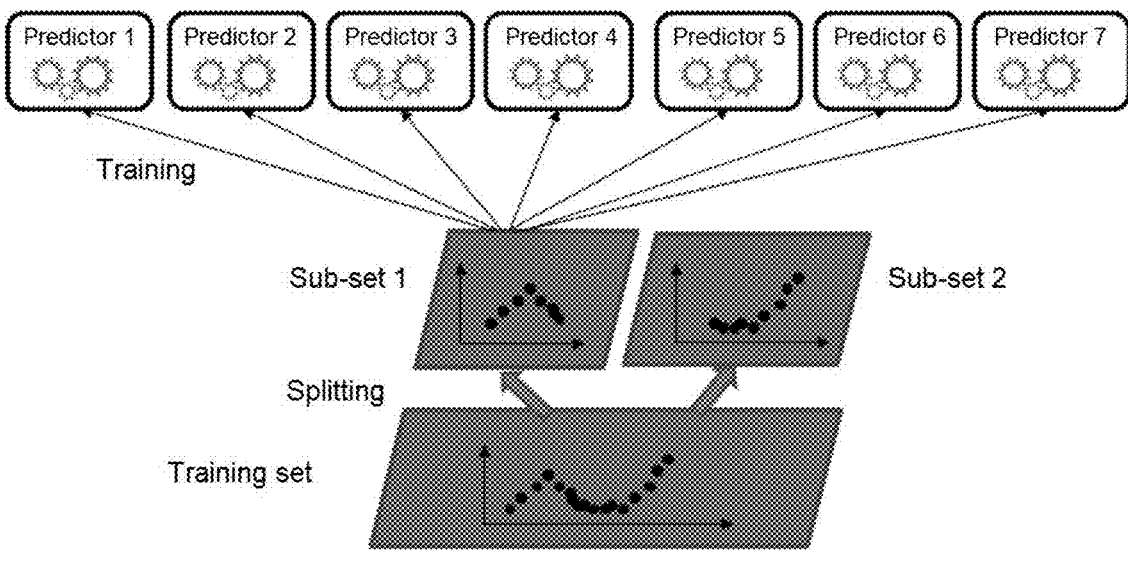
FIG. 3 is a schematic diagram of a scenario for a method of training a first-layer predictor according to an embodiment of the present disclosure.

As shown in FIG. 3, the training set data (actual values of the historical indicator data) are firstly preprocessed before the training. When the training data has missing values, the missing values will be filled with an average value of two days of data before and after the missing data.

Different types of predictors are selected as the first-layer predictor. In an embodiment, the first-layer predictor may include an elastic net predictor (predictor 1), a decision tree predictor (predictor 2), a k-nearest neighbor predictor (predictor 3), a random forest predictor (predictor 4), a lasso regression predictor (predictor 5), a support vector regression predictor (predictor 6), a gradient boosting predictor (predictor 7), etc.

A portion of the actual values of the historical latency indicator data is selected as a first data set (subset 1), and another portion of the data is selected as a second data set (subset 2). Each of the first-layer predictor is trained on the first data set. After each of the first-layer predictors has been trained, the second data set is input to each of the trained first-layer predictors for prediction, and the prediction result is namely the corresponding first actual predicted values of the historical latency indicator data. It should be noted that the first actual predicted values predicted by different types of predictors for the historical indicator data are not the same.

Figure 4:
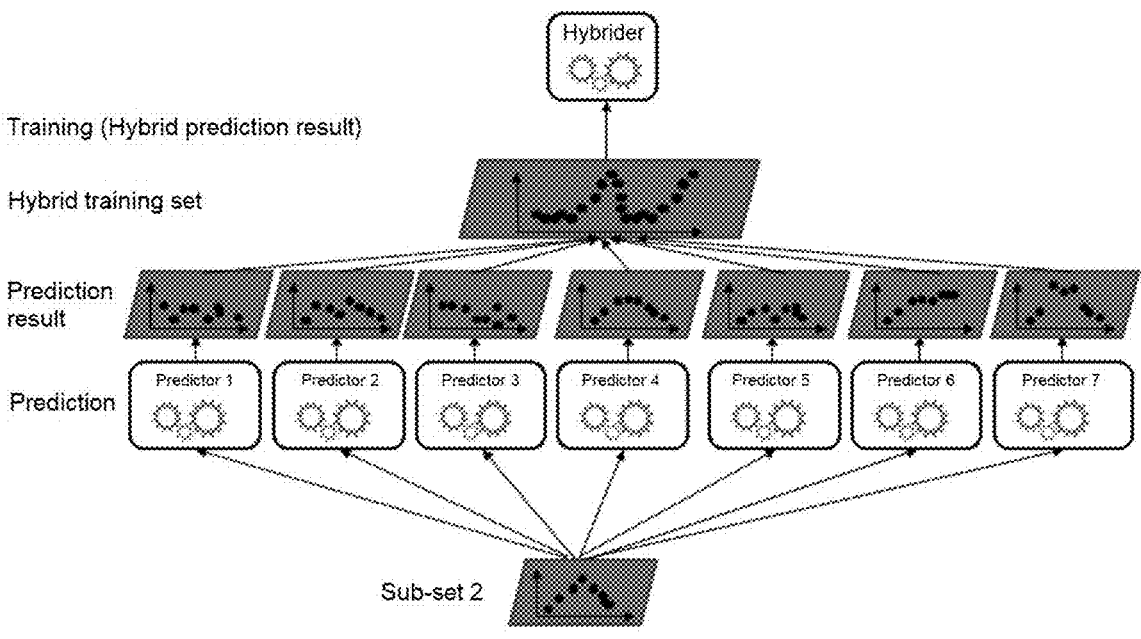
FIG. 4 is a schematic diagram of a scenario for a method of training a second-layer predictor according to an embodiment of the present disclosure.

Then, as shown in FIG. 4, all the prediction results of each first-layer predictor are mixed to obtain a hybrid data set (hybrid training set). The target predicted values of the historical latency indicator data are retained as a label during the mixing, and the target predicted values are acquired based on the historical latency indicator data. One (or more) second-layer predictor is trained on the hybrid data set and the target predicted values to acquire a trained second-layer predictor, where the second-layer predictor may be a lasso regression predictor, a random forest regression predictor, and the like. The plurality of trained first-layer predictors and the trained second-layer predictor then construct a two-layer predictor.

In an embodiment, the method as shown in FIG. 2 further includes:

proceeding with training at least one $N^{th}$-layer predictor on the target predicted values of the historical indicator data and the hybrid data set acquired by mixing all the $(N-1)^{th}$ actual predicted values when the layer number N does not reach the corresponding predetermined value.

In an example, a portion of the actual values of the historical latency indicator data is selected as a third data set when the layer number N equals to 3. The third data set is input to each of the trained second-layer predictors for prediction, and the prediction result is namely the corresponding second actual predicted values of the historical indicator data. At least one third-layer predictor is trained on the target predicted values of the historical latency indicator data and the hybrid data set acquired by mixing all the second actual predicted values. The third-layer predictor, serving as the last layer, may be a lasso regression predictor, a random forest regression predictor, and the like. Then, the plurality of trained first-layer predictors, and the second-layer predictor and trained third-layer predictor form a three-layer predictor. Similarly, the multi-layer predictor is sequentially constructed in the same way.

In an embodiment of the present disclosure, after the two-layer predictor is constructed, the future time period for prediction is input into the two-layer predictor to output the predicted values of the future latency indicator data. For example, a time period of tomorrow 24 hours is input into the two-layer predictor, and then goes into each of the first-layer predictors of different types for prediction separately, such that the first actual predicted values of the latency indicator data (e.g., the first actual predicted values of the response rate, the processing time compliance rate, or the average processing time) for each moment (minute or second) of the tomorrow 24 hours are output. All the prediction results output from the first-layer predictors and the target predicted values of the latency indicator data for the past 30 days are input to the second-layer predictors, such that the second actual predicted values of the latency indicator data (e.g., the second actual predicted values of the response rate, the processing time compliance rate, or the average processing time) for each moment (minute or second) of the tomorrow 24 hours are predicted and output as final predicted values of the future latency indicator data.

Then, the actual values of the historical latency indicator data are subtracted from the predicted values of the historical latency indicator data to acquire the historical prediction errors. For example, the differences between actual values of a response rate, a processing time compliance rate, and average processing time in the past 30 days and the predicted values of the response rate, the processing time compliance rate, and the average processing time in the past 30 days may yield prediction errors of the response rate, prediction errors of the processing time compliance rate, and prediction errors of the average processing time in the past 30 days. Then, the alarm threshold is calculated from the second actual predicted value of the latency indicator data for each moment (e.g., minute or second) of tomorrow 24 hours and the historical prediction error. Afterwards, the future latency indicator data is monitored, and an alarm is triggered when an actual value of the future latency indicator data exceeds the alarm threshold.

In this embodiment, a plurality of first-layer predictors of different types are utilized to cover various different types of indicator data. Further predictions are then implemented with the second-layer predictor, third-layer predictor, and so on to make the prediction more accurate. By adopting the multi-layer predictor to predict the predicted values of the future indicator data and further acquire the alarm thresholds, the accuracy of the alarm thresholds can be improved, the alarm thresholds can be adapted to the constantly changing indicator data, and the training speed can be improved.

In an embodiment, the step S111 as shown in FIG. 5 includes following steps S1111 to S1112.

S1111: Splitting the actual values of the historical indicator data into a first data set and a second data set S1112: Training, when N=2, a plurality of first-layer predictors of different types on the first data set, and inputting the second data set into each of the trained first-layer predictors to acquire corresponding first actual predicted values of the historical indicator data In an example, for a particular monitored object, the indicator data for a historical period is randomly split into a first data set and a second data set, and the splitting may be implemented in a variety of ways depending on the needs. For example, for transactions in payment transfers, the indicator data for the transactions from the first day to the past tenth day from today is taken as the first data set, and the indicator data from the past eleventh day to the past thirtieth day is taken as the second data set.

In an embodiment, the step S1112 as shown in FIG. 5 includes following steps S11121 to S11123.

S11121: Mapping the first data set $X1(x \in X1)$ to feature transformation functions $f_1, f_2, \ldots, f_M$ corresponding to the plurality of first-layer predictors to acquire transformed features $f_1(x) \ldots f_j(x) \ldots f_M(x)$, where $f_j(x) \in$ a set of real numbers S11122: Training the plurality of first-layer predictors on the transformed features $f_1(x), \ldots f_j(x) \ldots f_M(x)$ to acquire first-layer prediction functions corresponding to the plurality of trained first-layer predictors S11123: Inputting the second data set $X2(x \in X2)$ into each of the first-layer prediction functions $g_i(x)$ to acquire the first actual predicted values of the historical indicator data Where $i=1 \ldots L$, $j=1 \ldots M$, $L \leq 1$, $M \leq 1$, $M \leq L$, M refers to the number of the feature transformation functions, and L refers to the number of the first-layer predictors.

In an example, different types of first-layer predictors may have different input features. Each data point in the first data set is converted into an input feature $f_1(x) \ldots f_j(x) \ldots f_M(x)$ corresponding to each of the first-layer predictors via a conversion function to facilitate training of each of the first-layer predictors. The $g_i(x)$ is a prediction function of the first-layer predictor, and the result as calculated by this prediction function is the first actual predicted values. The function may for example be an elastic net prediction function, a decision tree prediction function, a kneighbor prediction function, a random forest prediction function, a lasso regression prediction function, a support vector regression prediction function, and a gradient boosting prediction function.

In an embodiment, the step S112 as shown in FIG. 5 includes following steps S1121 to S1124.

Figure 6:
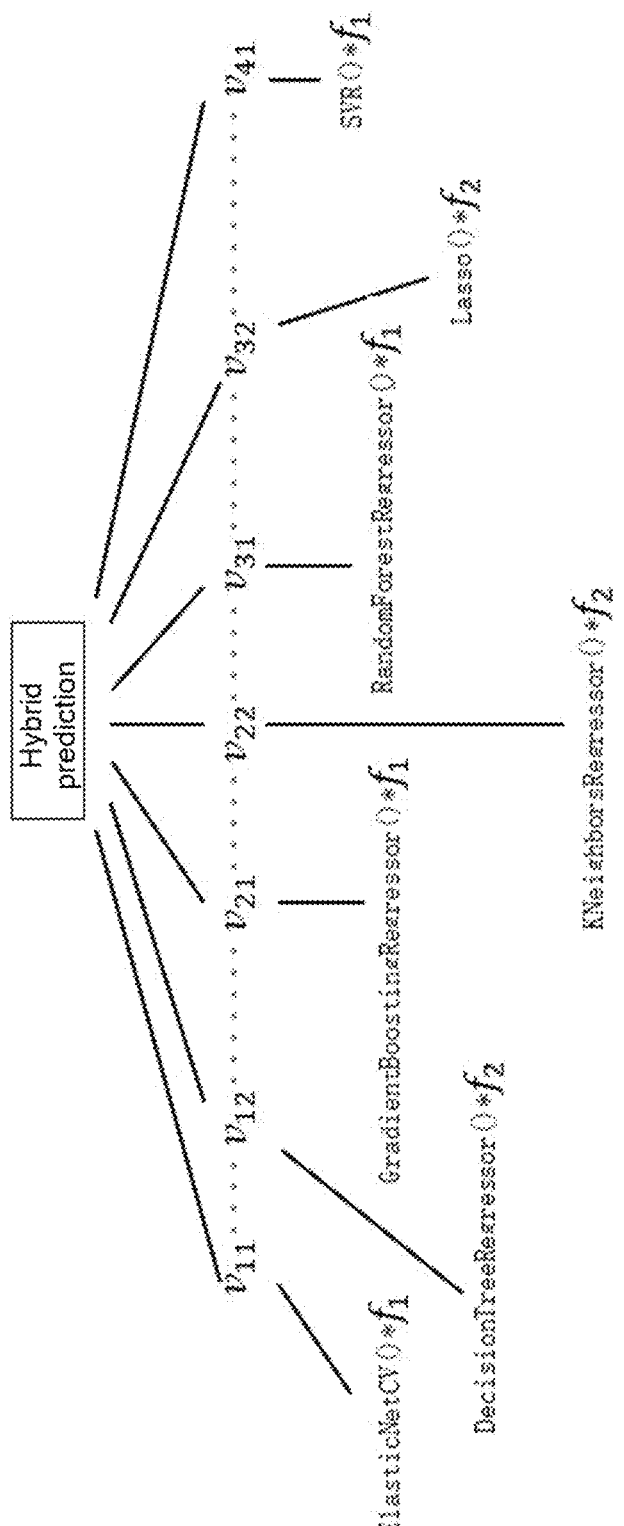
FIG. 6 is a schematic diagram for calculation of predictors according to an embodiment of the present disclosure.

S1121: Calculating a weight $w_i$ corresponding to the first-layer predictor from the transformed feature $f_j(x)$ by $w_i(x) = \in_j v_{ij} f_j(x)$, $\forall x \in X1$, $v_{ij}$ referring to a linear free parameter S1122: Acquiring, based on the weights $w_1 \ldots w_i \ldots w_L$ corresponding to the plurality of first-layer predictors and the plurality of first-layer prediction functions $g_1 \ldots g_i \ldots g_L$, the $N^{th}$-layer prediction function $b(x) = \in_i w_i g_i(x)$ corresponding to the $N^{th}$-layer predictor, that is $b(x) = \in_{i,j} v_{ij} f_j(x) g_i(x)$, $\forall x \in X1$ S1123: Mapping the first data set $X1(x \in X1)$ to $f_j(x) g_i(x)$ taken as a feature transformation function of a ridge regression algorithm model to acquire the linear free parameter $v_{ij}$ S1124: Calculating $$\min_{v} \sum_{x \in \tilde{X}} \sum_{i,j} (v_{ij} f_j(x) g_i(x) - y(x))^2,$$

and acquiring the trained $N^{th}$-layer predictor when the actual predicted values $v_{ij} f_j(x) g_i(x)$ of the $N^{th}$-layer predictor are approximate to target predicted values $y(x)$, where $y(x)$ refers to the target predicted values of respective data points x in the first data set, and $\tilde{X}$ refers to a subset of X In an example, as shown in FIG. 6, the outputs of a plurality of first-layer predictors of different types are combined by using the feature transformation function by training a ridge regression model to thereby acquire weights of the plurality of first-layer predictors of different types. For example, the linear free parameter $v_{11}$ corresponds to the elastic net prediction function, the linear free parameter $v_{12}$ corresponds to the decision tree regress prediction function, the linear free parameter $v_{21}$ corresponds to the gradient boosting regress prediction function, the linear free parameter $v_{22}$ corresponds to the k neighbor regress prediction function and the random forest regress prediction function, the linear free parameter $v_{32}$ corresponds to the lasso regress prediction function, and the linear free parameter $v_{41}$ corresponds to the support vector regress (SVR) prediction function.

In an embodiment, the method further includes:
calculating, for a plurality of predetermined time periods within a historical period corresponding to the first data set, a learning rate for corresponding historical indicator data in each of the predetermined time periods by using a preselection function. The learning rate is proportional to the weights corresponding to the first-layer predictors, such that the learning rate of each of the first-layer predictors increases when a time difference between the predetermined time period and a current time period decreases.

In an example, the historical period of the first data set (e.g., the past 30 days) is divided into a plurality of predetermined time periods (e.g., each day in the past serves as one predetermined time period). Then, the preselection function, which is a Gaussian function $f(x)=ae^{-(x-b)^2/2C^2}$, a=1, b−0, c=1, is adopted to calculate the weight of the historical indicator data for each of the past 30 days, such that the closer the historical indicator data is to today, the greater the weight. In addition, the Gaussian function and the learning rate are proportional, and the greater the value of the Gaussian function in the range of 0-1 in the horizontal coordinate, the greater the learning rate. Of course, the preselection function includes but is not limited to the Gaussian function.

As an important superparameter in supervised learning and deep learning, the learning rate determines whether and when the objective function converges to a local minimum. A suitable learning rate may enable the objective function to converge to the local minimum in a suitable time. In this embodiment, the learning rate causes the objective function $$\min_{v} \sum_{x \in \tilde{X}} \sum_{i,j} (v_{ij} f_j(x) g_i(x) - y(x))^2$$

to converge to the local minimum at a suitable time.

For a plurality of predetermined time periods within the historical period corresponding to the first data set, as the time difference between the predetermined time period and the current period decreases, the corresponding weights $w_i$ of the first-layer predictors may increase, which improves the prediction capability of the trained $N^{th}$-layer predictor and well adapts to the changing indicator data when the actual predicted values of the $N^{th}$-layer predictor are approximate to the target predicted values when the objective function converges.

Figure 7:
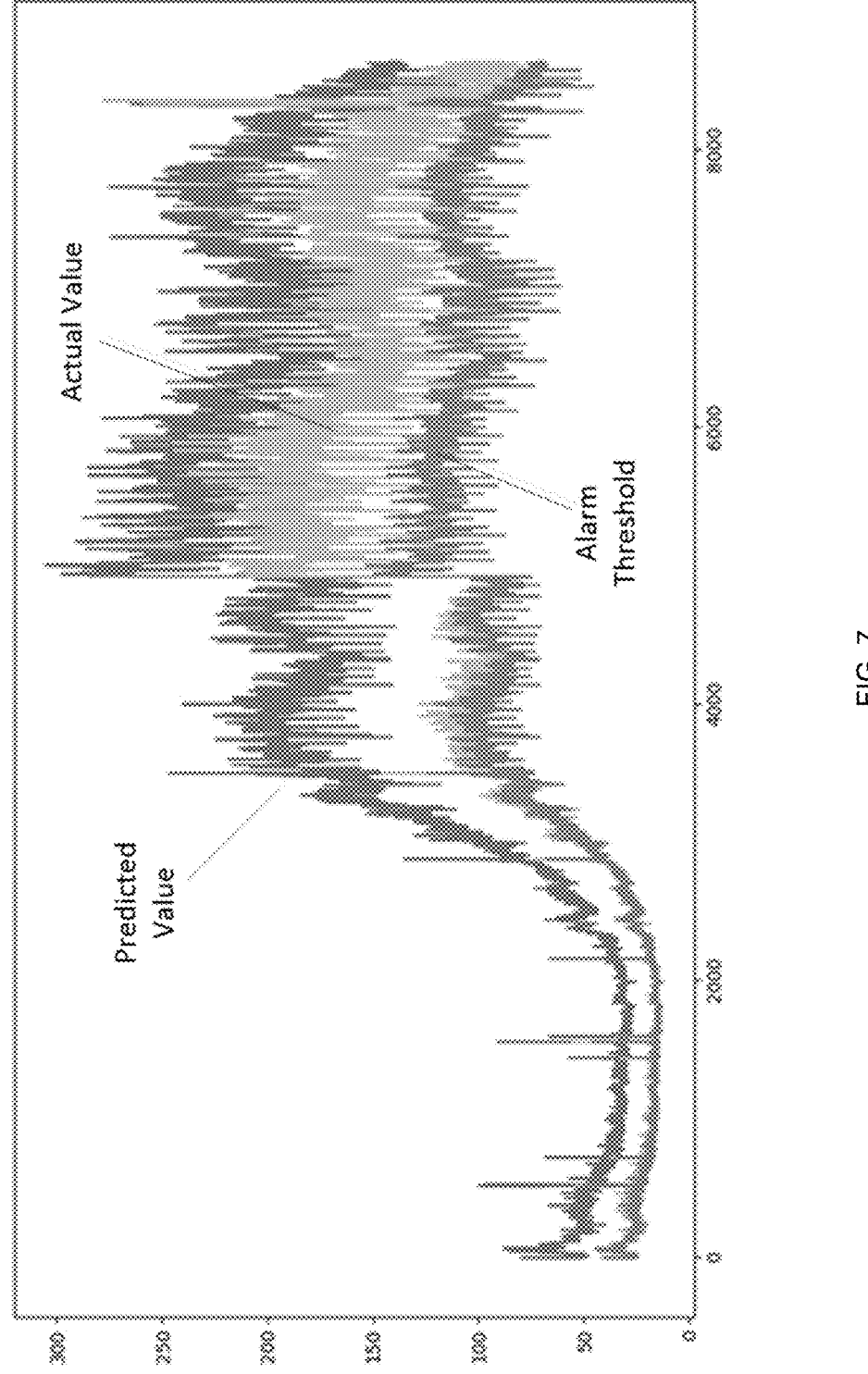
FIG. 7 is a schematic diagram for real-time monitoring based on machine learning according to an embodiment of the present disclosure.

FIG. 7 shows a real-time monitoring graph of a monitored object acquired on a certain day through the monitoring performed by using the monitoring method according to this embodiment. In FIG. 7, fluctuations (i.e. the vertical coordinate in units of milliseconds) of an indicator are shown, and the horizontal coordinate refers to the time in units of every 10 seconds, where the period from 0:00 to 12:00 corresponds to a range from 0 to 4320. As shown, given that the indicator fluctuates in the interval of 2000 to 4000, predicted values also fluctuate consequently in the interval of 4000 to 8000. In addition, the alarm thresholds as calculated are below the actual values, and thus no false alarm occurs.

In an embodiment, the method further includes:
calculating, for a plurality of predetermined time periods within a historical period corresponding to the second data set, a learning rate for historical indicator data in each of the predetermined time periods by using a preselection function. The learning rate is proportional to the weights corresponding to the first-layer predictors, such that the learning rate of each of the trained first-layer predictors increases when a time difference between the predetermined time period and a current time period decreases.

In an example, the example is similar to the aforesaid embodiment, and the difference merely lies in that the historical period of the second data set (e.g., the past 30 days) is divided into a plurality of predetermined time periods (e.g., each day in the past serves as one predetermined time period).

In an embodiment, the method further includes:
calculating, for a historical time period corresponding to the first actual predicted values of each historical indicator data, a learning rate for the first layer predicted values in each of the predetermined time periods by using the preselection function. The learning rate is proportional to the weights corresponding to the first-layer predictors, such that the learning rate of each of the trained first-layer predictors increases when a time difference between the predetermined time period and a current time period decreases.

In an example, the example is similar to the aforesaid embodiment, and the difference merely lies in that the historical time period (e.g., the past 30 days) corresponding to the first actual predicted values of each historical indicator data is divided into a plurality of predetermined time periods (e.g., each day in the past serves as one predetermined time period).

In an embodiment, the step S130 as shown in FIG. 2 includes following steps S131 to S132.

S131: Calculating the historical prediction errors by subtracting the actual values of the historical indicator data from the $N^{th}$ actual predicted values of the historical indicator data S132: Calculating the alarm thresholds from the predicted values of the future indicator data and the historical prediction errors according to a three sigma rule In an example, for the two-layer predictor, the historical prediction errors are namely the values acquired by subtracting the actual values of the historical indicator data from the second actual predicted values of the historical indicator data. For the three-layer predictor, the historical prediction errors are namely the values acquired by subtracting the actual values of the historical indicator data from the third actual predicted values of the historical indicator data. Similarly, for the multi-layer predictor, the historical prediction errors are namely the values acquired by subtracting the actual values of the historical indicator data from the $N^{th}$ actual predicted values of the historical indicator data.

Then, the alarm thresholds are calculated from the predicted values of the future indicator data and the historical prediction errors according to a three sigma rule. An alarm threshold is calculated for each moment of the next 24 hours for the monitored object under normal conditions, and the alarm is triggered when actual values of the indicator data of the monitored object continue to be higher than the upper thresholds or lower than the lower thresholds for a period of time in the next 24 hours. The specific alarming strategies may be combined and designed according to needs in business, which effectively improves the accuracy of the alarm thresholds.

Figure 8:
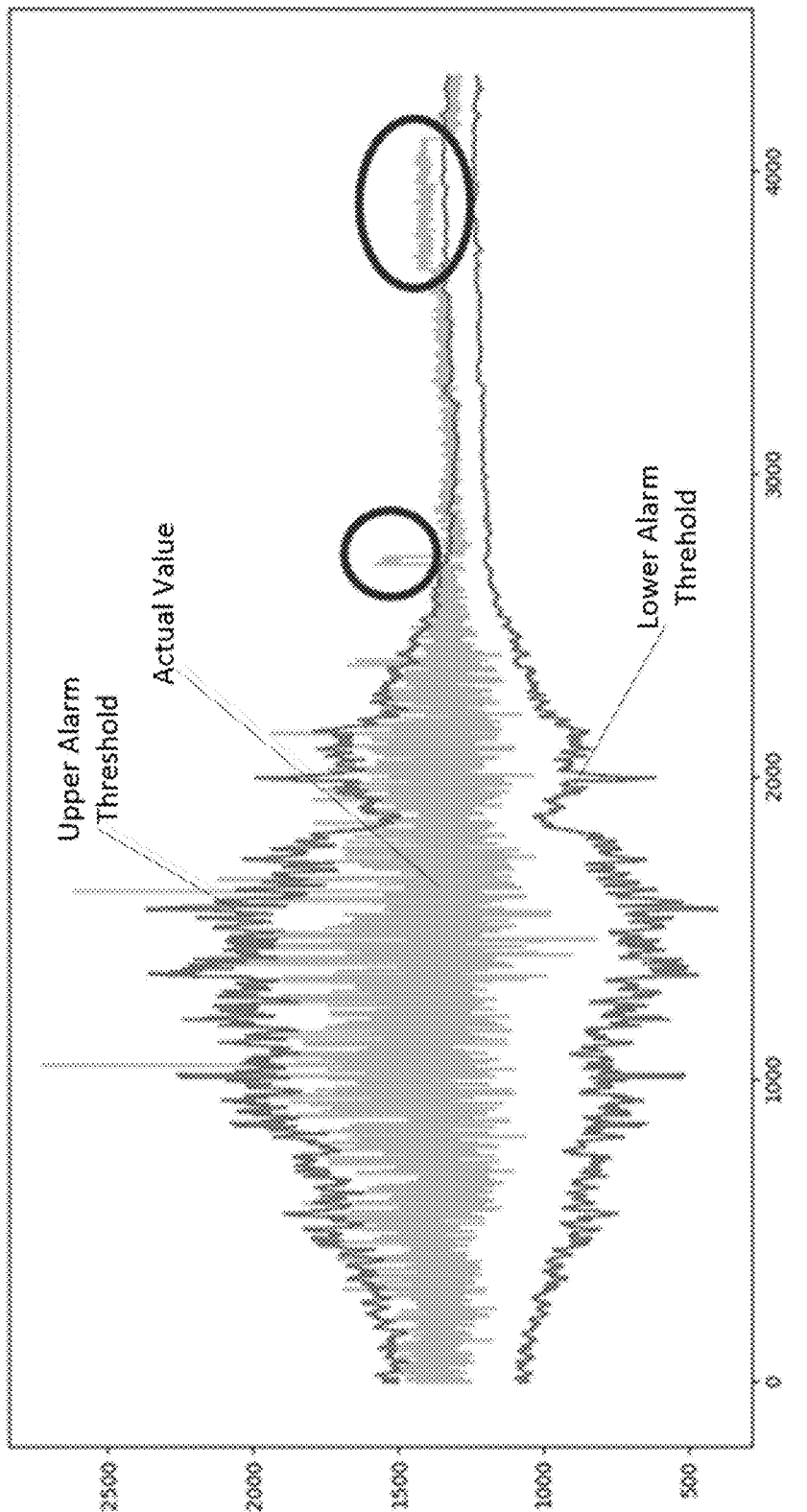
FIG. 8 is a schematic diagram for another real-time monitoring based on machine learning according to an embodiment of the present disclosure.
Figure 9:
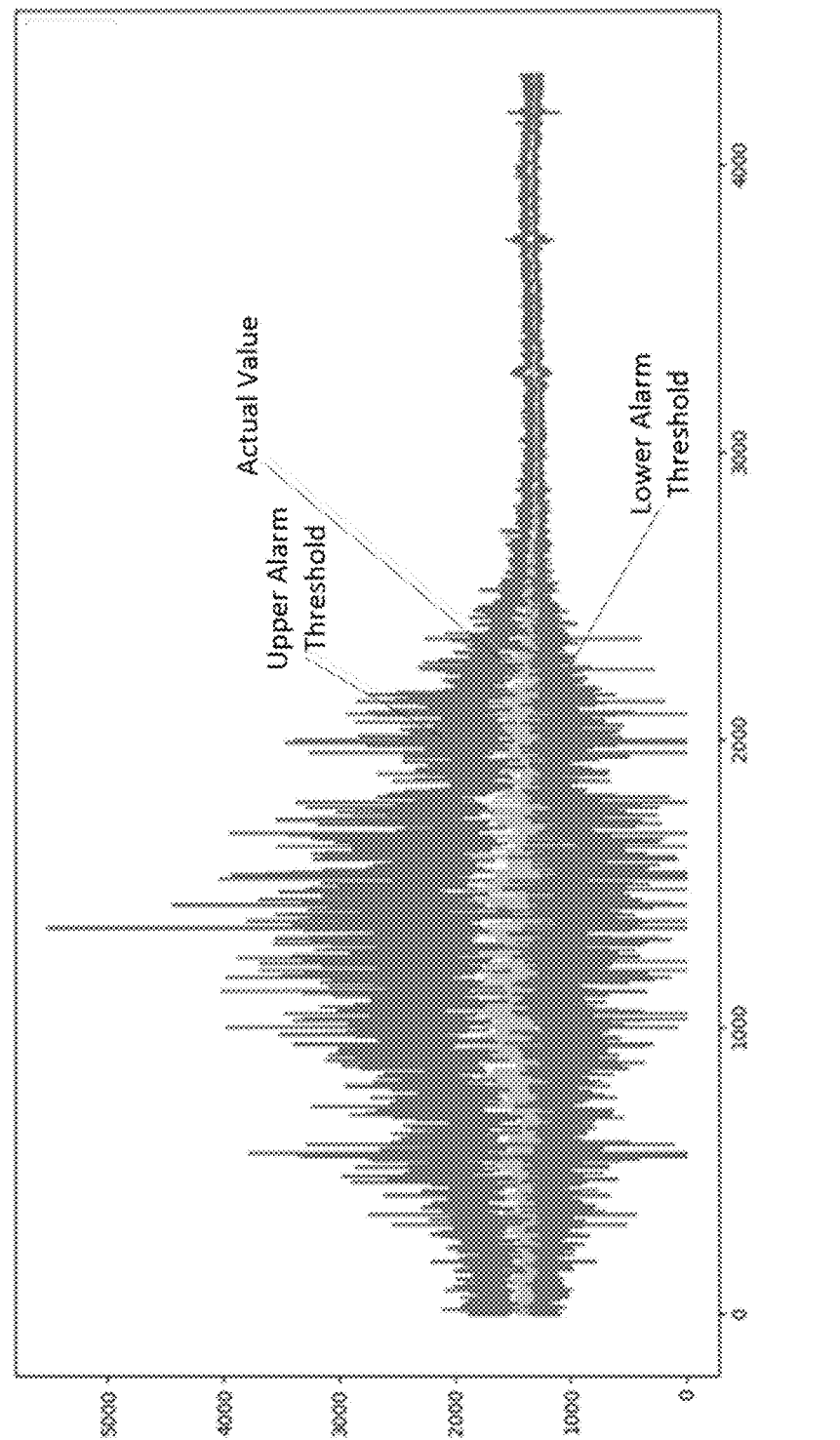
FIG. 9 is a schematic diagram for another real-time monitoring based on machine learning according to an embodiment of the present disclosure.
Figure 10:
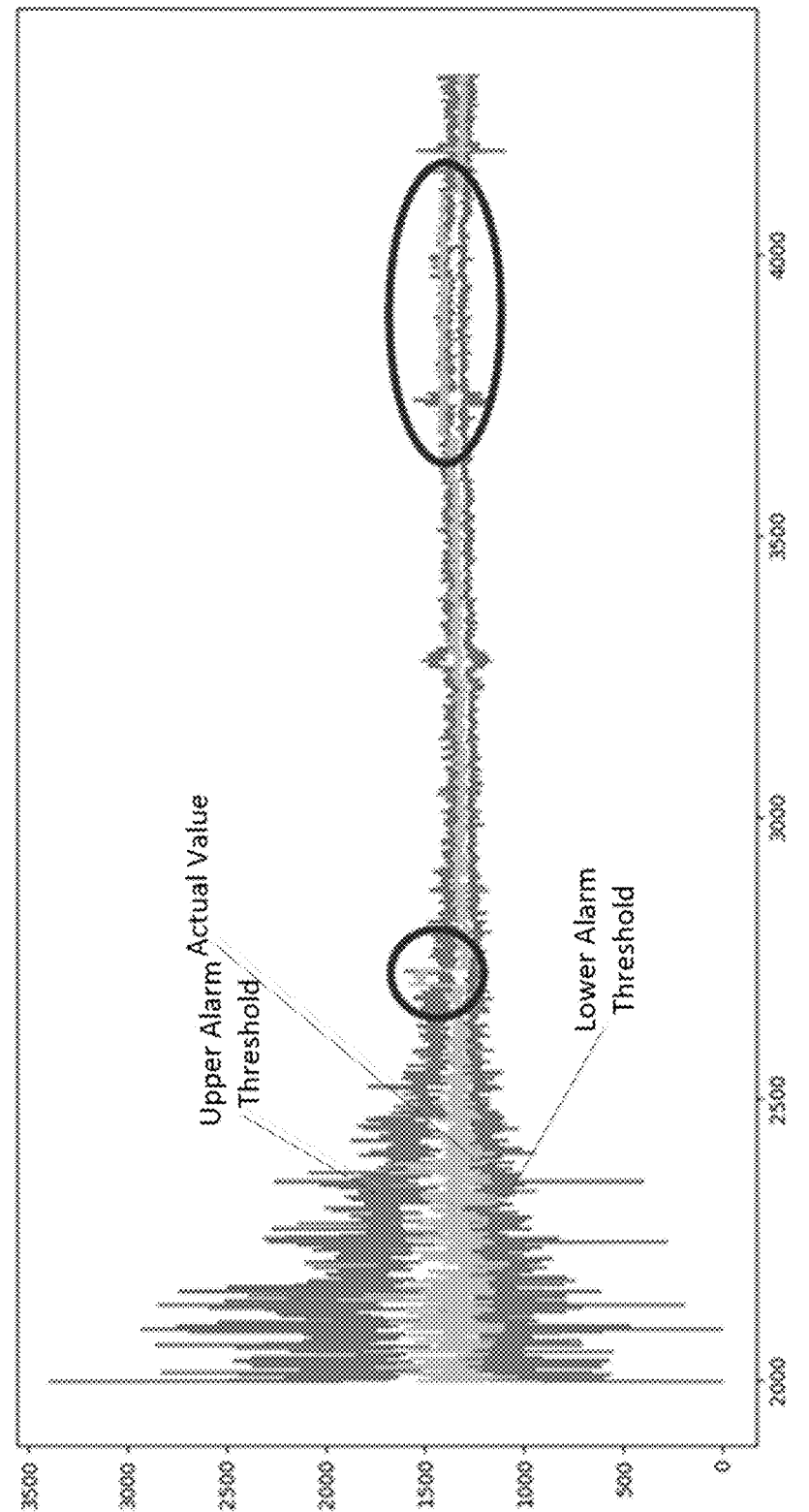
FIG. 10 is a schematic diagram for another real-time monitoring based on machine learning according to an embodiment of the present disclosure.

In an embodiment of the present disclosure, the effect achieved by the calculation of an alarm threshold range is shown in FIG. 8, FIG. 9 and FIG. 10. FIG. 8 shows fluctuations (i.e. the vertical coordinate in units of milliseconds) of an indicator of average processing time for the monitored object HTTP_A_QZ_pay from 0:00 to 12:00 on Feb. 28, 2020, where the horizontal coordinate refers to the time in units of every 10 seconds, with the period of 0:00 to 12:00 corresponding to a range from 0 to 4320. As shown, the solid circles mark a curve section when the fault occurs, that is, the alarm is triggered when actual values exceed the upper limits of the alarm threshold range or are lower than the lower limits of the alarm threshold range for a period of time. FIG. 9 shows an enlarged view of a part of FIG. 8 with horizontal coordinates from 2000 to 4320. As shown in FIG. 9, the alarm is generated quickly and accurately when a fault occurs in the monitored object, and there are no missed alarms. In FIG. 10, the green curve (i.e. the first curve) represents fluctuations (i.e. the vertical coordinate in units of milliseconds) of an indicator of average processing time for the monitored object HTTP_A_QZ_pay from 0:00 to 12:00 on Feb. 29, 2020, where the horizontal coordinate refers to the time in units of every 10 seconds, with the period of 0:00 to 12:00 corresponding to a range from 0 to 4320. The monitored object has faults starting from 0:00 on February 29, where the average processing time rises from about 1300 milliseconds to about 1500 milliseconds for the period from 0:00 to 12:00. The alarm is triggered when actual values exceed the upper limits of the alarm threshold range or are lower than the lower limits of the alarm threshold range for a sustained period of time. The alarm can be generated quickly and accurately when a fault occurs in the monitored object, which significantly reduces the missed and false alarms.

In an embodiment of the present disclosure, a data real-time monitoring system based on machine learning is provided, and the system includes a latency monitoring Apollo model. The pre-processed training data (the actual values of the historical indicator data) is included in the latency monitoring Apollo model (a multi-layer predictor) to output the predicted values of the future indicator data of the monitored object. The monitoring system loads the prediction results of the Apollo model every preset time period, calculates the alarm thresholds from the prediction results and historical prediction errors, and triggers an alarm when an actual value of the future indicator data exceeds the corresponding alarm threshold. The monitoring system may simultaneously monitor 440 monitoring objects in real time, and the model may quickly and accurately issue alarms whenever a fault occurs in the monitoring object. The Apollo model may be trained twice a day, and one physical machine may be adopted to train 506 monitored objects. Every 30 monitored objects are trained in parallel, such that the training can be completed and the prediction results can be acquired in 4 hours. When the rule in which the indicator data of the monitored object changes, the model may quickly learn the latest rule and react to the next day's predicted values, thereby ensuring no false alarms or missed alarms. Compared with the model using deep learning and neural networks, the model of this embodiment consumes less resource, is faster to train, and can quickly adapt to changes in data characteristics of the object. This model includes a matching degree verification procedure, which allows to select monitored objects adapted to the model, go online directly, and complete the verification of 3852 monitored objects from http and magpie data sources. Herein, 3649 objects are monitored by using this model, and the adaptation degree is up to 95%.

Figure 11:
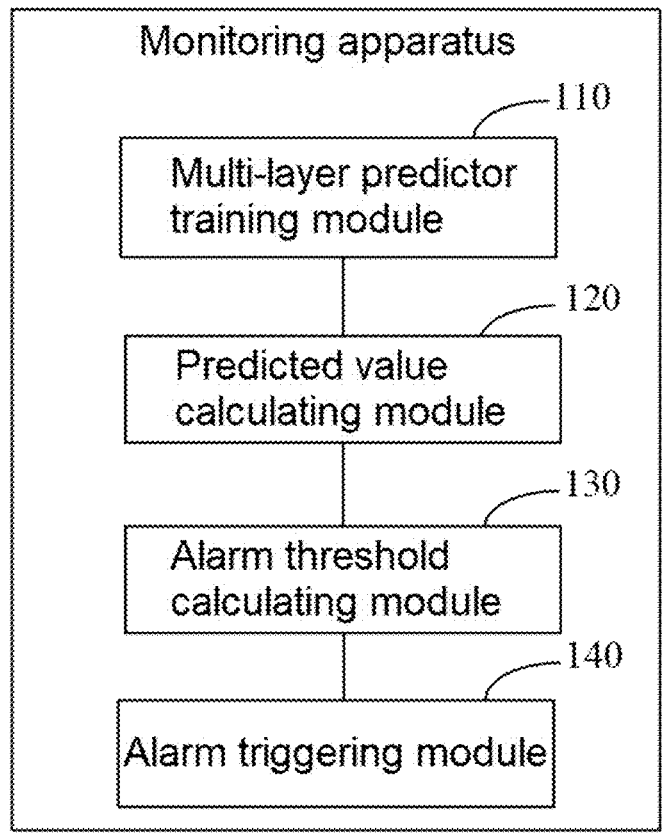
FIG. 11 is a schematic diagram of an apparatus for real-time data monitoring based on machine learning according to an embodiment of the present disclosure.

According to a specific embodiment, as shown in FIG. 11, the embodiment of the present disclosure provides an apparatus for real-time data monitoring based on machine learning, which includes:

a multi-layer predictor training module 110 configured to train a multi-layer predictor on actual values of historical indicator data, each layer of the multi-layer predictor including a plurality of predictors of different types;

a predicted value calculating module 120 configured to output predicted values of future indicator data by inputting a future time period for prediction into the trained multi-layer predictor;

an alarm threshold calculating module 130 configured to calculate alarm thresholds from the predicted values of the future indicator data and historical prediction errors; and an alarm triggering module 140 configured to trigger an alarm when an actual value of the future indicator data exceeds the corresponding alarm threshold.

In an embodiment, the plurality of predictors of different types include an elastic net predictor, a decision tree predictor, a k-nearest neighbor predictor, a random forest predictor, a lasso regression predictor, a support vector regression predictor, and a gradient boosting predictor.

Figure 12:
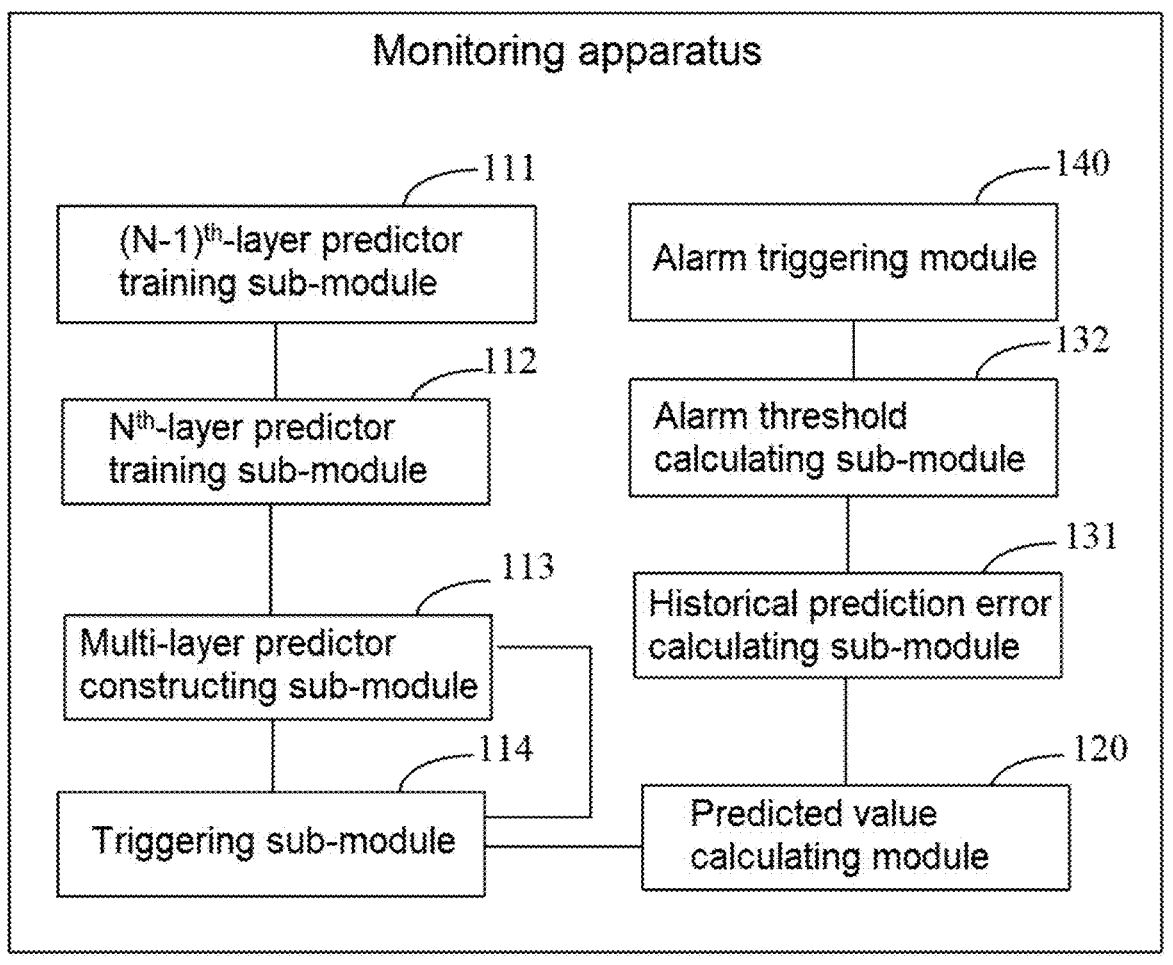
FIG. 12 is a schematic diagram of an apparatus for real-time data monitoring based on machine learning according to another embodiment of the present disclosure.

In an embodiment, the multi-layer predictor training module 110 as shown in FIG. 12 further includes:

an $(N-1)^{th}$-layer predictor training sub-module 111 configured to train a plurality of $(N-1)^{th}$-layer predictors of different types on the actual values of the historical indicator data, where the trained $(N-1)^{th}$-layer predictor is configured to predict $(N-1)^{th}$ actual predicted values of the historical indicator data;

an $N^{th}$-layer predictor training sub-module 112 configured to train at least one $N^{th}$-layer predictor on target predicted values of the historical indicator data and a hybrid data set acquired by mixing all the $(N-1)^{th}$ actual predicted values, the trained $N^{th}$-layer predictor being configured to predict $N^{th}$ actual predicted values of the historical indicator data, and N being greater than or equal to 2; and a multi-layer predictor constructing sub-module 113 configured to construct the multi-layer predictor with a plurality of the trained first-layer predictor to the trained $N^{th}$-layer predictor when a layer number N reaches a corresponding predetermined value.

In an embodiment, the apparatus as shown in FIG. 12 further includes:

a triggering sub-module 114 configured to trigger the $N^{th}$-layer predictor training sub-module 112 to train at least one $N^{th}$-layer predictor on the target predicted values of the historical indicator data and the hybrid data set acquired by mixing all the $(N-1)^{th}$ actual predicted values when the layer number N does not reach the corresponding predetermined value.

Figure 13:
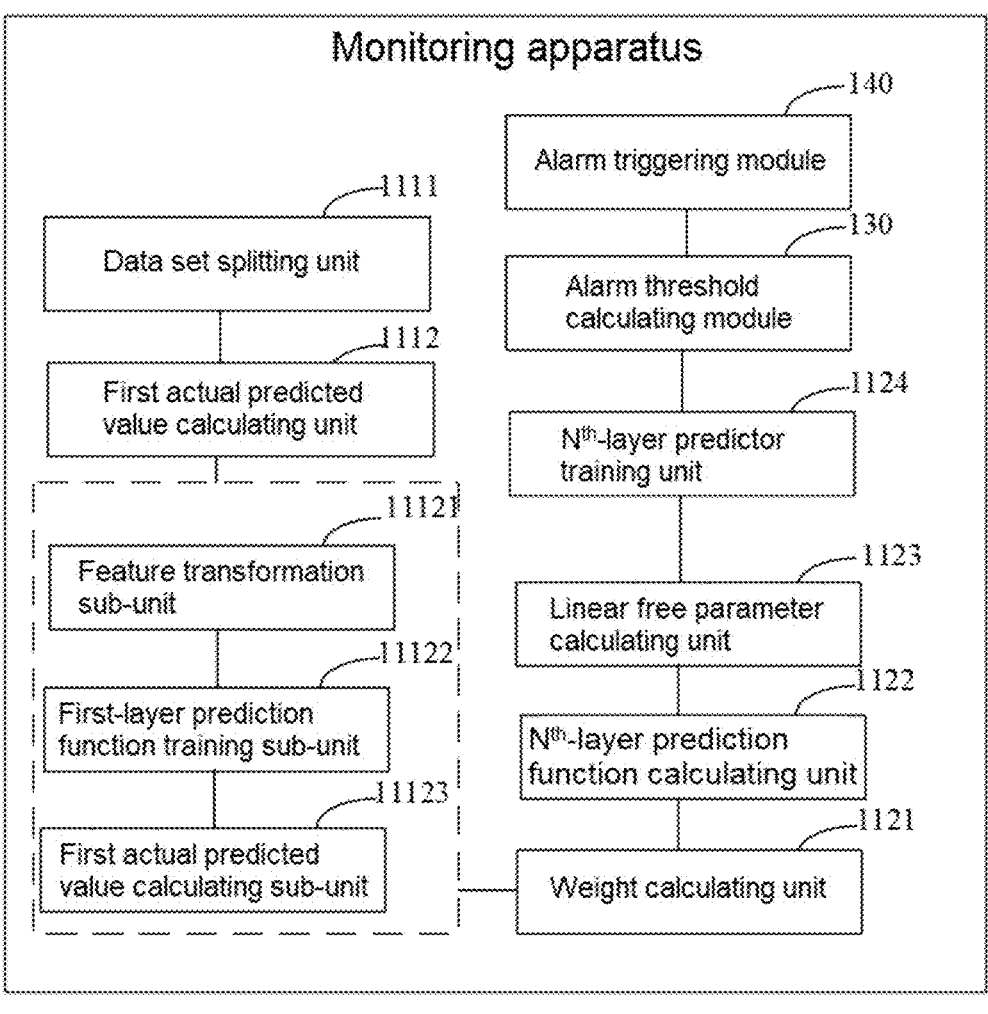
FIG. 13 is a schematic diagram of an apparatus for real-time data monitoring based on machine learning according to another embodiment of the present disclosure.

In an embodiment, the $(N-1)^{th}$-layer predictor training sub-module 111 as shown in FIG. 13 further includes:

a data set splitting unit 1111 configured to split the actual values of the historical indicator data into a first data set and a second data set; and a first actual predicted value calculating unit 1112 configured to train, when N=2, the plurality of first-layer predictors of different types on the first data set, and input the second data set into each of the trained first-layer predictors to acquire corresponding first actual predicted values of the historical indicator data.

In an embodiment, the first actual predicted value calculating unit 1112 as shown in FIG. 13 includes:

a feature transformation sub-unit 11121 configured to map the first data set $X1(x \in X1)$ to feature transformation functions $f_1, f_2, \ldots, f_M$ corresponding to the plurality of first-layer predictors to acquire transformed features $f_1(x) \ldots f_j(x) \ldots f_M(x)$, where $f_j(x) \in$ a set of real numbers;

a first-layer prediction function training sub-unit 11122 configured to train the plurality of first-layer predictors on the transformed features $f_1(x), \ldots f_j(x) \ldots f_M(x)$ to acquire first-layer prediction functions $g_1 \ldots g_i \ldots g_L$ corresponding to the plurality of trained first-layer predictors; and a first actual predicted value calculating sub-unit 11123 configured to input the second data set $X2(x \in X2)$ into each of the first-layer prediction functions $g_i(x)$ to acquire the first actual predicted values of the historical indicator data;

where $i=1 \ldots L$ refers to the number of the feature transformation functions, and L refers to the number of the first-layer predictors.

In an embodiment, the $N^{th}$-layer predictor training sub-module 112 as shown in FIG. 13 further includes:

a weight calculating unit 1121 configured to calculate a weight $w_1$ corresponding to the first-layer predictor from the transformed feature $f_j(x)$ by $w_1(x) = \in_j v_{ij} f_j(x)$, $\forall x \in X1$, $v_{ij}$ referring to a linear free parameter;

an $N^{th}$-layer prediction function calculating unit 1122 configured to acquire, based on the weights $w_1 \ldots w_i \ldots w_L$ corresponding to the plurality of first-layer predictors and the plurality of first-layer prediction functions $g_1 \ldots g_i \ldots g_L$, the $N^{th}$-layer prediction function $b(x) = \in_i w_i g_i(x)$ corresponding to the $N^{th}$-layer predictor, that is $b(x) = \in_{i,j} v_{ij} f_j(x) g_i(x)$, $\forall x \in X1$;

a linear free parameter calculating unit 1123 configured to map the first data set $X1(x \in X1)$ to $f_j(x) g_i(x)$ taken as a feature transformation function of a ridge regression algorithm model to acquire the linear free parameter $v_{ij}$; and an $N^{th}$-layer predictor training unit 1124 configured to calculate $$\min_{v} \sum_{x \in \tilde{X}} \sum_{i,j} (v_{ij} f_j(x) g_i(x) - y(x))^2$$

and acquire the trained $N^{th}$-layer predictor when the actual predicted values $v_{ij} f_j(x) g_i(x)$ of the $N^{th}$-layer predictor are approximate to target predicted values $y(x)$, $y(x)$ referring to the target predicted values of respective data points x in the first data set, and $\tilde{X}$ referring to a subset of X.

In an embodiment, the apparatus further includes:

a first learning rate calculating module configured to calculate, for a plurality of predetermined time periods within a historical period corresponding to the first data set, a learning rate for indicator data in each of the predetermined time periods by using a preselection function, such that the learning rate of each of the trained first-layer predictors increases when a difference between each of the predetermined time periods and a current time period decreases.

In an embodiment, the apparatus further includes:

a second learning rate calculating module configured to calculate, for a plurality of predetermined time periods within a historical period corresponding to the second data set, a learning rate for indicator data in each of the predetermined time periods by using a preselection function, such that the learning rate of each of the trained first-layer predictors increases when a difference between each of the predetermined time periods and a current time period decreases.

In an embodiment, the apparatus further includes:

a third learning rate calculating module configured to calculate, for a historical time period corresponding to the first actual predicted values of each historical indicator data, a learning rate for the first actual predicted values corresponding to each of the historical time period by using the preselection function, such that the learning rate of each of the trained first-layer predictors increases when a difference between each of the historical time period and a current time period decreases.

In an embodiment, the alarm threshold calculating module 130 as shown in FIG. 12 includes:

a historical prediction error calculating sub-module 131 configured to calculate the historical prediction errors by subtracting the actual values of the historical indicator data from the $N^{th}$ actual predicted values of the historical indicator data; and an alarm threshold calculating sub-module 132 configured to calculate the alarm thresholds from the predicted values of the future indicator data and the historical prediction errors according to a three sigma rule.

The functions of each module in the apparatus according to embodiments of the present disclosure may be found in the corresponding descriptions of the method and will not be repeated herein.

According to embodiments of the present disclosure, the present disclosure further provides an electronic device and a readable storage medium.

Figure 14:
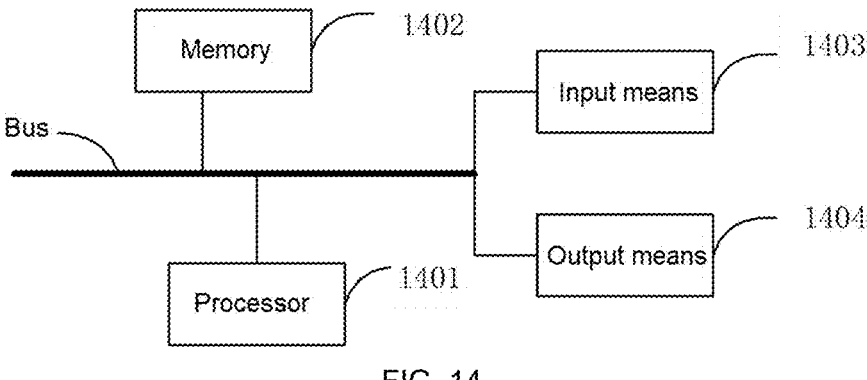
FIG. 14 is a block diagram of an electronic device for implementing the method of real-time data monitoring based on machine learning according to embodiments of the present disclosure.

FIG. 14 as shown is a block diagram of an electronic device for implementing the method of real-time data monitoring based on machine learning according to embodiments of the present disclosure. The electronic device is intended to denote various forms of digital computers, such as laptops, desktop computers, workstations, personal digital assistants, servers, blade servers, mainframe computers, and other suitable computers. The electronic device may also denote various forms of mobile devices, such as personal digital assistants, cellular phones, smart phones, wearable devices, and other similar computing devices. The components, the connection and relationship therebetween, and the functions thereof are shown herein as examples only and are not intended to limit the implementations of the present disclosure as described and/or claimed herein.

As shown in FIG. 14, the electronic device includes: one or more processors 1401, a memory 1402, and interfaces for connecting the components, including a high speed interface and a low speed interface. The components are interconnected via different buses and may be mounted on a common motherboard or mounted in other fashions according to needs. The processor may process instructions executed within the electronic device, and the instructions may include instructions stored in or on a memory to display graphical user interface (GUI) graphical information on an external input/output means (e.g., a display device coupled to an interface). In other embodiments, a plurality of processors and/or a plurality of buses may be adopted with a plurality of memories, if desired. Similarly, a plurality of electronic devices may be connected, with each device providing some of the necessary operations (e.g., as a server array, a group of blade servers, or a multiprocessor system). FIG. 14 is illustrated by taking one processor 1401 as an example.

The memory 1402 is the non-instantaneous computer readable storage medium according to the present disclosure. The memory has instructions executable by at least one processor stored therein to cause the at least one processor to implement one of the method of real-time data monitoring based on machine learning according to the present disclosure. The non-instantaneous computer readable storage medium of the present disclosure has computer instructions stored thereon that are configured to cause the computer to implement the method of real-time data monitoring based on machine learning according to the present disclosure.

The memory 1402, as a non-instantaneous computer readable storage medium, may be configured to have non-instantaneous software programs, non-instantaneous computer executable programs, and modules stored therein, such as the program instructions/modules (such as the multi-layer predictor training module 110, the predicted value calculating module 120, the alarm threshold calculating module 130, and the alarm triggering module 140 as shown in FIG. 11) corresponding to the method of real-time data monitoring based on machine learning according to embodiments of the present disclosure. The processor 1401 performs various functional applications of the server and data processing by running non-instantaneous software programs, instructions, and modules stored in the memory 1402, which means to implement the method of real-time data monitoring based on machine learning according to the aforesaid method embodiments.

The memory 1402 may include a program storing area and a data storing area. The program storing area may store an operating system, and an application program required for at least one function, and the data storing area may store data created under the use of an electronic device for the method of real-time data monitoring based on machine learning. In addition, the memory 1402 may include a high-speed random access memory and a non-instantaneous memory, such as at least one disk memory device, a flash memory device, or other non-instantaneous solid-state memory device. In some embodiments, the memory 1402 optionally includes a memory disposed remotely relative to the processor 1401, and such a remote memory may be connected via a network to the electronic device for the method of real-time data monitoring based on machine learning. Examples of the network include, but are not limited to, the Internet, a corporate intranet, a local area network, a mobile communication network, and a combination thereof.

The electronic device for the method of real-time data monitoring based on machine learning may further include an input means 1403 and an output means 1404. The processor 1401, the memory 1402, the input means 1403 and the output means 1404 may be connected via a bus or other fashions, and FIG. 14 is illustrated by taking the connection via a bus as an example.

The input means 1403 may receive input numeric or character information, and generate the key signal input related to user settings and functional control of the electronic device for the method of real-time data monitoring based on machine learning, such as a touch screen, keypad, mouse, trackpad, touchpad, indicator stick, one or more mouse buttons, trackball, joystick, and other input means. The output means 1404 may include a display device, an auxiliary lighting device (e.g., LED), a haptic feedback device (e.g., a vibration motor), and the like. The display device may include, but is not limited to, a liquid crystal display (LCD), a light emitting diode (LED) display, and a plasma display. In some embodiments, the display device may be a touch screen.

The various embodiments of the system and technique described herein may be implemented in a digital electronic circuit system, an integrated circuit system, an application specific integrated circuit (ASIC), a computer hardware, a firmware, a software, and/or a combination thereof. The various embodiments may include the implementation in one or more computer programs that may be executed and/or interpreted on a programmable system including at least one programmable processor. The programmable processor may be a dedicated or general-purpose programmable processor that may receive data and instructions from a storage system, at least one input means, and at least one output means, and transfer data and instructions to the storage system, the at least one input means, and the at least one output means.

The computing programs (also referred to as programs, software, software applications, or code) include machine instructions for a programmable processor and may be implemented with a high-level procedural and/or object-oriented programming language, and/or an assembly/machine language. As used herein, the terms "machine readable medium" and "computer readable medium" refer to any computer program product, device, and/or apparatus (e.g., disk, CD, memory, programmable logic device (PLD)) adopted to provide machine instructions and/or data to a programmable processor, which includes a machine readable medium that receives machine instructions as machine-readable signals. The term "machine-readable signal" refers to any signal adopted to provide machine instructions and/or data to a programmable processor.

To provide interaction with a user, the system and technique described herein may be implemented on a computer. The computer has a display device (e.g., a cathode ray tube (CRT) or liquid crystal display (LCD) monitor) for displaying information to the user, and a keyboard and pointing device (e.g., a mouse or trackball) through which the user can provide input to the computer. Other types of devices may also be adopted to provide interaction with the user. For example, the feedback provided to the user may be any form of sensory feedback (e.g., visual feedback, auditory feedback, or haptic feedback), and the input from the user may be received in any form (including acoustic input, voice input, or, haptic input).

The system and technique described herein may be implemented in a computing system including a backend component (e.g., as a data server), or a computing system including a middleware component (e.g., an application server), or a computing system including a frontend component (e.g., a user computer having a graphical user interface or a web browser through which a user may interact with implementations of the system and technique described herein), or a computing system including any combination of the backend component, the middleware component, or the frontend component. The components of a system may be interconnected by the digital data communication (e.g., a communication network) in any form or medium. Examples of the communication network include a local area network (LAN), a wide area network (WAN), and the internet.

The computer system may include a client and a server. The client and server are generally disposed distal from each other and typically interact over a communication network. The relationship between the client and the server is generated by computer programs that run on the corresponding computer and have a client-server relationship with each other.

It should be understood that the steps may be reordered, added or deleted by the various forms of process shown above. For example, the steps in the present disclosure may be performed in parallel or sequentially or in a different order, as long as the desired result of the technical solution disclosed in the present disclosure can be achieved, which is not limited herein.

The aforesaid embodiments do not constitute a limitation on the protection scope of the present disclosure. Those skilled in the art shall understand that various modifications, combinations, sub-combinations and substitutions may be made according to design requirements and other factors. The modification, equivalent replacement, improvement, or the like made according to the spirit and principle of the present disclosure shall be regarded as within the protection scope of the present disclosure.

What is claimed is:

1. A method of real-time data monitoring based on machine learning, comprising:

training a multi-layer predictor on actual values of historical indicator data, each layer of the multi-layer predictor comprising a plurality of predictors of different types;

outputting predicted values of future indicator data by inputting a future time period for prediction into the trained multi-layer predictor;

calculating alarm thresholds from the predicted values of the future indicator data and historical prediction errors; and triggering an alarm when an actual value of the future indicator data exceeds the corresponding alarm threshold, wherein training the multi-layer predictor on the actual values of the historical indicator data comprises:

training a plurality of $(N-1)^{th}$-layer predictors of different types on the actual values of the historical indicator data, and predicting $(N-1)^{th}$ actual predicted values of the historical indicator data by using the trained $(N-1)^{th}$-layer predictors;

training at least one $N^{th}$-layer predictor on target predicted values of the historical indicator data and a hybrid data set acquired by mixing all the $(N-1)^{th}$ actual predicted values, wherein the trained $N^{th}$-layer predictor is configured to predict $N^{th}$ actual predicted values of the historical indicator data, N being greater than or equal to 2; and constructing the multi-layer predictor with a plurality of trained first-layer predictors to the trained $N^{th}$-layer predictor when a layer number N reaches a corresponding predetermined value, wherein calculating the alarm thresholds from the predicted values of the future indicator data and the historical prediction errors comprises:

calculating the historical prediction errors by subtracting the actual values of the historical indicator data from the $N^{th}$ actual predicted values of the historical indicator data; and calculating the alarm thresholds from the predicted values of the future indicator data and the historical prediction errors according to a three sigma rule.

2. The method according to claim 1, wherein the plurality of predictors of different types comprise an elastic net predictor, a decision tree predictor, a k-nearest neighbor predictor, a random forest predictor, a lasso regression predictor, a support vector regression predictor, and a gradient boosting predictor.

3. The method according to claim 1, further comprising:

proceeding with again training at least one $N^{th}$-layer predictor on the target predicted values of the historical indicator data and the hybrid data set acquired by mixing all the $(N-1)^{th}$ actual predicted values, when the layer number N does not reach the corresponding predetermined value.

4. The method according to claim 1, wherein training the plurality of $(N-1)^{th}$-layer predictors of different types on the actual values of the historical indicator data and predicting the $(N-1)^{th}$ actual predicted values of the historical indicator data by using the trained $(N-1)^{th}$-layer predictors comprises:

splitting the actual values of the historical indicator data into a first data set and a second data set; and training, when N=2, a plurality of first-layer predictors of different types on the first data set, and inputting the second data set into each of the trained first-layer predictors to acquire corresponding first actual predicted values of the historical indicator data.

5. The method according to claim 4, wherein training, when N=2, the plurality of first-layer predictors of different types on the first data set, and inputting the second data set into each of the trained first-layer predictors to acquire the first actual predicted values of the historical indicator data comprises:

mapping the first data set $X1(x \in X1)$ to feature transformation functions $f_1, f_2, \ldots, f_M$ corresponding to the plurality of first-layer predictors to acquire transformed features $f_1(x) \ldots f_j(x) \ldots f_M(x)$, wherein $f_j(x) \in$ a set of real numbers;

training the plurality of first-layer predictors on the transformed features $f_1(x), \ldots f_j(x) \ldots f_M(x)$ to acquire first-layer prediction functions $g_1 \ldots g_i \ldots g_L$ corresponding to the plurality of trained first-layer predictors; and inputting the second data set $X2(x \in X2)$ into each of the first-layer prediction functions $g_i(x)$ to acquire the first actual predicted values of the historical indicator data;

wherein $i=1 \ldots L$, $j=1 \ldots M$, $L \geq 1$, $M \geq 1$, $M \geq L$, M refers to the number of the feature transformation functions, and L refers to the number of the first-layer predictors.

6. The method according to claim 5, wherein training the at least one $N^{th}$-layer predictor on the target predicted values of the historical indicator data and the hybrid data set acquired by mixing all the first actual predicted values comprises:

calculating weights $w_i$ corresponding to the first-layer predictors from the transformed features $f_j(x)$ by $w_i(x)= \Sigma_j v_{ij} f_j(x), \forall x \in X1$, wherein $v_{ij}$ refers to a linear free parameter;

acquiring, based on the weights $w_1 \ldots w_i \ldots w_L$ corresponding to the plurality of first-layer predictors and the plurality of first-layer prediction functions $g_1 \ldots g_i \ldots g_L$, an $N^{th}$-layer prediction function $b(x)=\Sigma_i w_i g_i(x)$ corresponding to the $N^{th}$-layer predictor, that is $b(x)=\Sigma_{i,j} v_{ij} f_j(x) g_i(x), \forall x \in X1$;

mapping the first data set $X1(x \in X1)$ to $f_j(x)g_i(x)$ taken as a feature transformation function of a ridge regression algorithm model to acquire the linear free parameter $v_{ij}$; and calculating $$\min_v \sum_{x \in \bar{X}} \sum_{i,j} (v_{ij} f_j(x) g_i(x) - y(x))^2,$$

and acquiring the trained $N^{th}$-layer predictor when the actual predicted values $v_{ij} f_i(x) g_i(x)$ of the $N^{th}$-layer predictor are approximate to target predicted values $y(x)$, wherein $y(x)$ refers to the target predicted values of respective data points $x$ in the first data set, and $X$ refers to a subset of $X1$.

7. The method according to claim 6, further comprising: calculating, for a plurality of predetermined time periods within a historical period corresponding to the first data set, a learning rate for indicator data in each of the predetermined time periods by using a preselection function, wherein the learning rate is proportional to the weights corresponding to the first-layer predictors, such that the learning rate of each of the trained first-layer predictors increases when a difference between each of the predetermined time periods and a current time period decreases.

8. The method according to claim 6, further comprising: calculating, for a plurality of predetermined time periods within a historical period corresponding to the second data set, a learning rate for indicator data in each of the predetermined time periods by using a preselection function, wherein the learning rate is proportional to the weights corresponding to the first-layer predictors, such that the learning rate of each of the trained first-layer predictors increases when a difference between each of the predetermined time periods and a current time period decreases.

9. The method according to claim 4, further comprising: calculating, for a historical time period corresponding to the first actual predicted values of each historical indicator data, a learning rate for the first actual predicted values corresponding to each of the historical time period by using a preselection function, wherein the learning rate is proportional to the weights corresponding to the first-layer predictors, such that the learning rate of each of the trained first-layer predictors increases when a difference between each of the historical time period and a current time period decreases.

10. A non-transitory computer readable storage medium having computer instructions stored thereon, wherein the computer instructions are configured to cause a computer to implement the method according to claim 1.

11. An apparatus for real-time data monitoring based on machine learning, comprising:
a multi-layer predictor training module configured to train a multi-layer predictor on actual values of historical indicator data, each layer of the multi-layer predictor comprising a plurality of predictors of different types;

a predicted value calculating module configured to output predicted values of future indicator data by inputting a future time period for prediction into the trained multi-layer predictor;

an alarm threshold calculating module configured to calculate alarm thresholds from the predicted values of the future indicator data and historical prediction errors; and an alarm triggering module configured to trigger an alarm when an actual value of the future indicator data exceeds the corresponding alarm threshold, wherein the multi-layer predictor training module comprises:

an $(N-1)^{th}$-layer predictor training sub-module configured to train a plurality of $(N-1)^{th}$-layer predictors of different types on the actual values of the historical indicator data, wherein the trained $(N-1)^{th}$-layer predictor is configured to predict $(N-1)^{th}$ actual predicted values of the historical indicator data;

an $N^{th}$-layer predictor training sub-module configured to train at least one $N^{th}$-layer predictor on target predicted values of the historical indicator data and a hybrid data set acquired by mixing all the $(N-1)^{th}$ actual predicted values, wherein the trained $N^{th}$-layer predictor is configured to predict $N^{th}$ actual predicted values of the historical indicator data, N being greater than or equal to 2; and a multi-layer predictor constructing sub-module configured to construct the multi-layer predictor with a plurality of trained first-layer predictors to the trained $N^{th}$-layer predictor when a layer number N reaches a corresponding predetermined value, wherein the alarm threshold calculating module comprises:

a historical prediction error calculating sub-module configured to calculate the historical prediction errors by subtracting the actual values of the historical indicator data from the $N^{th}$ actual predicted values of the historical indicator data; and an alarm threshold calculating sub-module configured to calculate the alarm thresholds from the predicted values of the future indicator data and the historical prediction errors according to a three sigma rule.

12. The apparatus according to claim 11, wherein the plurality of predictors of different types comprise an elastic net predictor, a decision tree predictor, a k-nearest neighbor predictor, a random forest predictor, a lasso regression predictor, a support vector regression predictor, and a gradient boosting predictor.

13. The apparatus according to claim 11, wherein the multi-layer predictor training module further comprises:
a triggering sub-module configured to trigger the $N^{th}$-layer predictor training sub-module to train at least one $N^{th}$-layer predictor on the target predicted values of the historical indicator data and the hybrid data set acquired by mixing all the $(N-1)^{th}$ actual predicted values when the layer number N does not reach the corresponding predetermined value.

14. The apparatus according to claim 11, wherein the $(N-1)^{th}$-layer predictor training sub-module comprises:
a data set splitting unit configured to split the actual values of the historical indicator data into a first data set and a second data set; and
a first actual predicted value calculating unit configured to train, when N=2, a plurality of first-layer predictors of different types on the first data set, and input the second data set into each of the trained first-layer predictors to acquire corresponding first actual predicted values of the historical indicator data.

15. The apparatus according to claim 14, wherein the first actual predicted value calculating unit comprises:

a feature transformation sub-unit configured to map the first data set $X1(x \in X1)$ to feature transformation functions $f_1, f_2, \ldots, f_M$ corresponding to the plurality of first-layer predictors to thereby acquire transformed features $f_1(x) \ldots f_j(x) \ldots f_M(x)$, wherein $f_j(x) \in$ a set of real numbers;

first-layer prediction function training sub-unit configured to train the plurality of first-layer predictors on the transformed features $f_1(x), \ldots f_M(x) \ldots f_M(x)$ to acquire first-layer prediction functions $g_1 \ldots g_i \ldots g_L$ corresponding to the plurality of trained first-layer predictors; and a first actual predicted value calculating sub-unit configured to input the second data set $X2(x \in X2)$ into each of the first-layer prediction functions $g_i(x)$ to acquire the first actual predicted values of the historical indicator data;

wherein $i=1 \ldots L$, $j=1 \ldots M$, $L \geq 1$, $M \geq 1$, $M \geq L$, M refers to the number of the feature transformation functions, and L refers to the number of the first-layer predictors.

16. The apparatus according to claim 15, wherein the $N^{th}$-layer predictor training sub-module comprises:

a weight calculating unit configured to calculate a weight $w_i$ corresponding to the first-layer predictor from the transformed feature $f_j(x)$ by $w_i(x)=\Sigma_j v_{ij} f_j(x), \forall x \in X$ wherein $v_{ij}$ refers to a linear free parameter;

an $N^{th}$-layer prediction function calculating unit configured to acquire, based on the weights $w_1 \ldots w_i \ldots w_L$ corresponding to the plurality of first-layer predictors and the plurality of first-layer prediction functions $g_1 \ldots g_i \ldots g_L$, the $N^{th}$-layer prediction function $b(x)=\Sigma_i w_i g_i(x)$ corresponding to the $N^{th}$-layer predictor, that is $b(x)=\Sigma_{i,j} v_{ij} f_j(x) g_i(x), \forall x \in X1$;

a linear free parameter calculating unit configured to map the first data set $X1(x \in X1)$ to $f_j(x) g_i(x)$ taken as a feature transformation function of a ridge regression algorithm model to acquire the linear free parameter $v_{ij}$; and an $N^{th}$-layer predictor training unit configured to calculate $$\min_v \sum_{x \in \tilde{X}} \sum_{i,j} (v_{ij} f_j(x) g_i(x) - y(x))^2$$

and acquire the trained $N^{th}$-layer predictor when the actual predicted values $v_{ij} f_j(x) g_i(x)$ of the $N^{th}$-layer predictor are approximate to target predicted values $y(x)$, wherein $y(x)$ refers to the target predicted values of respective data points $x$ in the first data set, and $\tilde{X}$ refers to a subset of X.

17. The apparatus according to claim 16, further comprising:

a first learning rate calculating module configured to calculate, for a plurality of predetermined time periods within a historical period corresponding to the first data set, a learning rate for indicator data in each of the predetermined time periods by using a preselection function, such that the learning rate of each of the trained first-layer predictors increases when a difference between each of the predetermined time periods and a current time period decreases.

18. The apparatus according to claim 16, further comprising:

a second learning rate calculating module configured to calculate, for a plurality of predetermined time periods within a historical period corresponding to the second data set, a learning rate for indicator data in each of the predetermined time periods by using a preselection function, such that the learning rate of each of the trained first-layer predictors increases when a difference between each of the predetermined time periods and a current time period decreases.

19. The apparatus according to claim 14, further comprising:

a third learning rate calculating module configured to calculate, for a historical time period corresponding to the first actual predicted values of each historical indicator data, a learning rate for the first actual predicted values corresponding to each of the historical time periods by using a preselection function, such that the learning rate of each of the trained first-layer predictors increases when a difference between each of the historical time period and a current time period decreases.

\* \* \* \* \*